United States Patent [19]
Tracy et al.

[11] Patent Number: 6,029,115
[45] Date of Patent: Feb. 22, 2000

[54] ANALYZING SPECTROMETRIC DATA

[75] Inventors: David H. Tracy, Norwalk; Alan M. Ganz, Trumbull; Yongdong Wang, Wilton, all of Conn.; David A. Huppler, Madison, Wis.; Juan C. Ivaldi, Foster City, Calif.; Christopher B. Hanna, Somerville, Mass.

[73] Assignee: Perkin Elmer LLC, Norwalk, Conn.

[21] Appl. No.: 08/940,575

[22] Filed: Sep. 30, 1997

Related U.S. Application Data

[60] Provisional application No. 60/026,879, Oct. 3, 1997.

[51] Int. Cl.[7] .................................................. G01R 35/00
[52] U.S. Cl. ............................ 702/22; 356/326; 356/328; 356/319
[58] Field of Search .............................. 702/22; 356/300, 356/319, 326, 328

[56] References Cited

U.S. PATENT DOCUMENTS

| | | | |
|---|---|---|---|
| 4,820,048 | 4/1989 | Barnard | 356/328 |
| 5,308,982 | 5/1994 | Ivaldi et al. | 250/339.01 |
| 5,412,468 | 5/1995 | Lundberg et al. | 356/326 |

FOREIGN PATENT DOCUMENTS

| | | |
|---|---|---|
| 0344783 | 12/1989 | European Pat. Off. . |
| 0560006 | 9/1993 | European Pat. Off. . |

*Primary Examiner*—Marc S. Hoff
*Assistant Examiner*—Hien Vo
*Attorney, Agent, or Firm*—St. Onge Steward Johnston & Reens LLC

[57] ABSTRACT

A spectrometric instrument includes a detector with detecting subarrays on small portions of the surface. Spectral data are acquired for selected subarrays at a first time for a drift standard, and compared to a zero position to obtain first offset data. Data are acquired similarly at a second time to obtain second offset data. The offset data are utilized to obtain a spectral shift for any subarray position at any selected time. The shift is applied to a matrix model used for converting test data to compositional information. Archive data for the model is obtained in the foregoing manner, using slit scanning in the instrument to achieve sub-increments smaller than the detector pixel size, with a procedure to assure that there is an integral number of scanning steps across one pixel. The drift standard may be chemical analytes, or an optical interference element producing fringes related to spectral positions in each subarray. A procedure is used to identify the fringe peaks to spectral position, with temperature correction.

54 Claims, 10 Drawing Sheets

6,029,115

ANALYZING SPECTROMETRIC DATA

This application claims the benefit of priority of provisional patent application Ser. No. 60/026,879 filed on Oct. 3, 1997.

FIELD OF THE INVENTION

This invention relates to spectrometric instruments and particularly to analyzing spectrometric data in such instruments.

BACKGROUND

Spectrometric instruments include a dispersion element, such as a diffraction grating, and a detector system. Modern instruments include a computer that is receptive of spectral data from the detector to analyze and compare spectra. With improvements in optics, detectors and computerization, there has evolved an ability to perform very precise measurements.

One type of instrument utilizes an inductively coupled plasma (ICP) with sample injection to effect spectral lines of atomic elements. A spectrophotometer used in conjunction with ICP is a crossed grating type that produces a two dimensional array of spectral lines. A detector for the array has segmented subarrays of photosensitive pixels located strategically only at expected locations of the spectral lines. A solid state device such as a charge coupled device (CCD) with the photosensitive pixels in the subarrays is used. A crossed grating spectrophotometer incorporating such a detector is disclosed in U.S. Pat. No. 4,820,048 (Barnard).

With the evolving requirements for precision, variations among instruments, and drift in each instrument (e.g. from temperature and pressure variations) have become more of a problem. U.S. Pat. No. 5,303,165 (Ganz et al, "Ganz patent") discloses standardization of instruments by transforming spectral data with a transformation filter derived from a specified line profile common to the instruments. Spectral lines as displayed by a spectrometric instrument actually have a finite width and profile, and the standardization corrects for variations in instrument profile. Such standardization is distinguished from calibration associated with quantification. Determination of compositional quantities of a sample is carried out separately or in conjunction with standardization. Wavelength calibration may be associated with standardization, but actual wavelengths of measured spectra are not necessarily needed. The technique of the Ganz patent is quite precise and useful, particularly with continuous array detectors, but suffers from a requirement for substantial amounts of spectral data collection and associated lengthy computations. The Ganz patent also discloses the use of a source of regular fringe peaks for wavelength calibration, but such use is not suited for a segmented subarray detector.

The presence and quantity of components in a sample may be determined with computer computations by application of calibration models to spectral data, the models being derived from spectra of known quantities of sample analytes (individual atomic elements). An archive of model data is stored in computer memory for application to sample data for essentially automatic determination of components and their quantities in the sample. One approach is disclosed in U.S. Pat. No. 5,308,982 (Ivaldi et al) which incorporates a derivative of sample spectral data into the matrix model to compensate for spectral drift. This is a standardization that requires spectral data to be acquired in relatively small spectral increments to achieve sufficient representation of the derivative in the model. Wavelength increments of spectral data ordinarily is limited by pixel size. Smaller increments are achieved by slit scanning in which the inlet slit to the spectrometer is imaged on a pixel. Varying the lateral position of the slit in small steps effectively moves a spectrum across the pixels to obtain spectral data in smaller increments. Although utilized for collecting archive data, it is preferable that slit scanning be avoided to speed up ordinary data acquisition.

SUMMARY

Objects of the invention are to provide a novel method and a novel means for analyzing spectral data in a spectrometric instrument having a plurality of detecting subarrays. Other objects are to provide such a method and a means for correcting for instrument variations including drift. Other objects are to provide such a method and a means for adjusting model calibration data to instrument conditions currently with sample data acquisition. Further objects are to provide a novel method and a novel means for constructing a calibration model for a spectrometric instrument. Further objects are to provide a novel method and a novel means for adjusting slit scanning in a spectrometric instrument. Additional objects are to provide a novel method and a novel means for utilizing a source of regular fringe peaks for wavelength calibration with a segmented subarray photodetector in a spectrometric instrument.

The foregoing and other objects are achieved, at least in part by analyzing spectral data in a spectrometric instrument that includes a dispersion element and a detector receptive of dispersed light from the element, the detector having a plurality of detecting subarrays, with each subarray being at a different position on the detector. Advantageously the detecting subarrays constitute a small portion of the detector surface. The selected subarrays may be substantially fewer in number than the plurality of detecting subarrays.

First spectral data are acquired for a drift standard for selected subarray positions at a first time, and compared to a preassigned zero position for each selected subarray to obtain first offset data. Second spectral data are acquired for the drift standard for the selected subarray positions at a second time, and compared to the zero position for each selected subarray to obtain second offset data. The first offset data and the second offset data are utilized to obtain a spectral shift for any subarray position at any selected time relative to the first time by interpolation or extrapolation. Advantageously, the first offset data are used to obtain a first offset function defining an offset for any subarray position, the second offset data are used to obtain a second offset function defining an offset for any subarray position, and the difference between the first offset function and the second offset function is utilized to obtain the spectral shift.

Although the shift may be applied to test data, advantageously the shift is applied to a matrix model used for converting the data to compositional information. For this, a base matrix model is formed of base spectral data for at least one selected analyte. Test spectral data are acquired for a test sample at the selected time, using the spectral shift to shift the base spectral data to the model spectral data for the selected time to effect a shifted matrix model associated with instrument conditions at the selected time. The shifted matrix model is applied to the test spectral data so as to yield a parameter representing concentration of the selected analyte.

Archive data for the matrix model preferably is obtained in the foregoing manner to account for spectral shift during data acquisition. More preferably the data are acquired with slit scanning in the instrument to achieve sub-increments smaller than pixel size in the detector, utilizing a procedure to assure that there is known spacing between scanning steps across one pixel.

The drift standard may be a chemical standard of selected analytes, or an optical element such as an interference element, producing regular secondary peaks (fringes) related to spectral positions in each subarray. To utilize an interference element, the instrument further includes a calibration source of a primary spectral peak having an identified spectral position. Each secondary peak has an integer order number identified by a correlation function to a peak spectral position in accordance with a single correlation constant (related to thickness of the element). To relate the secondary peaks to spectral positions, primary spectral data are acquired for the primary peak in a first subarray position, and secondary spectral data are acquired for secondary peaks in the first subarray position and in other selected subarray positions. An initial correlation constant with a specified range thereof are estimated. A tentative order number is calculated with the correlation function, the identified spectral position, and the initial correlation constant; and a nearest integer order number to the tentative order number is selected. A corresponding first correlation constant is recalculated with the nearest integer order number, so as to thereby effect a first number-constant pair. Another correlation constant is calculated with a new order number constituting said nearest integer order number shifted by one to effect another number-constant pair. The calculations are repeated with further integer order numbers shifted by additional ones until a set of number-constant pairs is effected for the specified range of correlation constant, for the first subarray.

In another selected subarray, a secondary peak is identified to a nominal peak position determined by the nominal calibration. With the correlation function, the nominal peak position and each correlation constant of the pair set, further order numbers are computed to effect additional number-constant pairs. All correlation constants in the additional pairs associated with order numbers that are non-integers are designated, and all such corresponding pairs are deleted from the full set. The foregoing three steps are repeated until a single correlation constant in the pairs of the set remains to establish an effective correlation constant and corresponding remaining integer order numbers. With the correlation function, the effective correlation constant and the remaining integer order numbers in the set, the spectral position is computed for each selected secondary peak in each selected subarray. If temperature varies, a procedure should be used to adjust the index of refraction of the interference element used in the correlation function.

DETAILED DESCRIPTION

Figure 1:
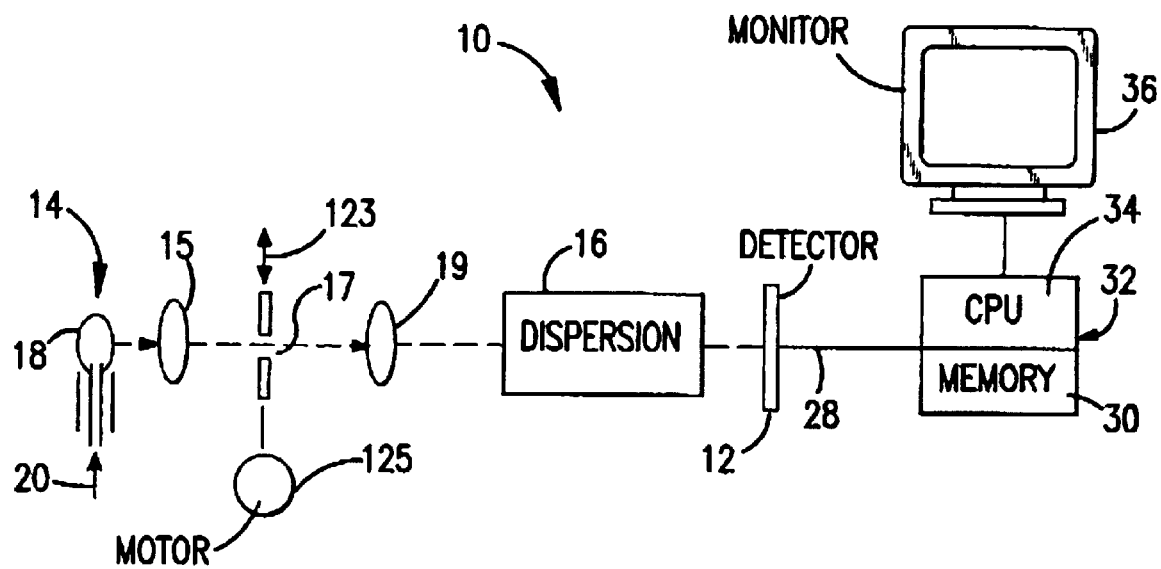
FIG. 1 is a schematic drawing of a spectrometric instrument used for the invention.

The invention is utilized with a conventional or other desired spectrometric instrument 10 (FIG. 1) for spectral analysis in the general range of infrared, visible and ultraviolet radiation, where spectral features are in narrow bands or spectral lines received on an array photodetector 12 from ICP light source 14 via an entrance lens 15, a slit 17, another focusing lens 19 and a dispersion element 16 such as a grating or prism. The instrument utilizes, for example, an inductively coupled plasma 18 with sample injection 20 for the light source to effect atomic or ionic emission lines, such as a Perkin-Elmer Optima 3000 instrument. Alternatively, the instrument may be adapted for molecular spectroscopy such as the type described in the aforementioned U.S. Pat. No. 5,303,165 (Ganz), but with substitution of the present invention for the standardization described therein.

Figure 2:
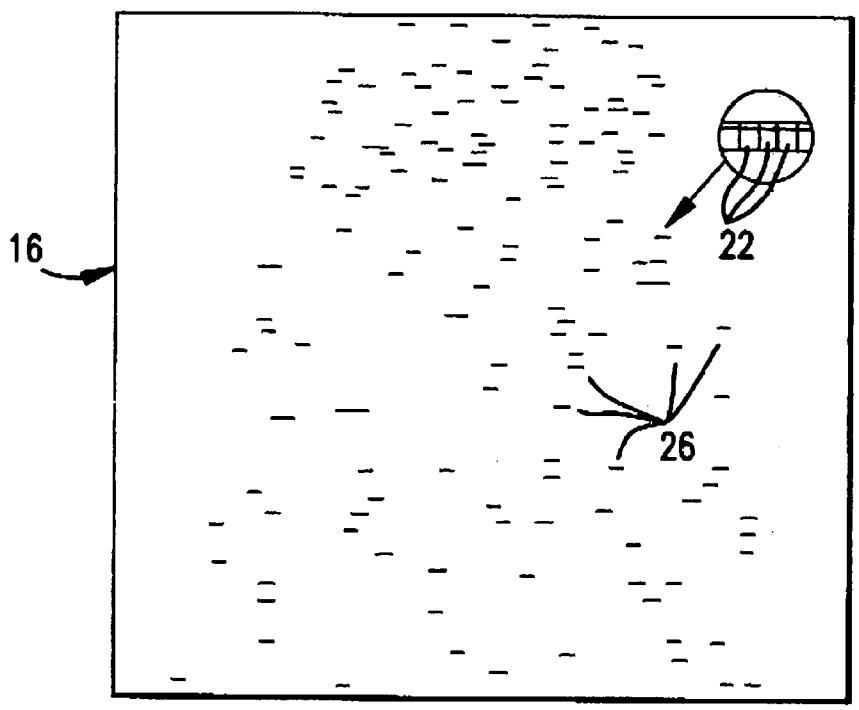
FIG. 2 is a schematic view of the front surface of a detector in the instrument of FIG. 1, showing subarrays of photosensitive pixels.

The detector 16 (FIG. 2) in such an instrument typically is a self scanned photodiode array, a charge injection device or preferably a charge-coupled device (CCD) with photosensitive pixels 22 distributed over a two dimensional surface 24 as segmented subarrays 26 of pixels at selected positions of expected spectral lines as disclosed in the aforementioned U.S. Pat. No. 4,820,048 (Barnard) of the present assignee, incorporated in its entirety herein by reference. The spectral lines in this case are effected by crossed dispersion elements such as a pair of gratings or a grating and a prism. In other applications the pixels in an array cover the entire detecting surface of a linear or two dimensional detector.

Figure 3:
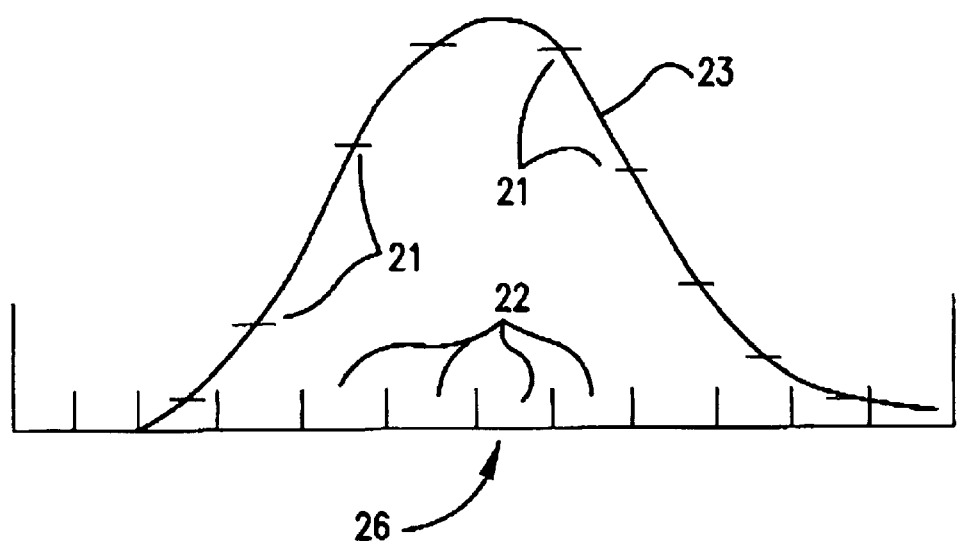
FIG. 3 shows the shape of a spectral feature and associated levels of photo energy received by pixels of the detector of FIG. 2.

Reference to "subarray" herein and in the claims means either selected groupings of pixels otherwise distributed over an entire linear or two-dimensional surface, or segmented subarrays of pixels at selected positions. The term "pixel position" refers conventionally to spectral position in the finite increments of an array photodetector. A segmented array detector may contain, for example, 7000 pixels in 245 subarrays with each subarray containing 10 to 40 pixels, generally about 16 pixels. Spectral data 21 (FIG. 3) for a spectral feature 23 obtained from the detector via a signal line 28 (FIG. 1) and stored in a memory section 30 of the computer 32 of the instrument is representative of photo energy received by each pixel 22 in a subarray 26 during a cycle period. An instrument often is calibrated for wavelength (or wavenumber) against pixel positions; however, as explained below, this is not necessary in some aspects of the present invention where the instrument provides compositional information without need for wavelength data. The invention is applied in conjunction with the computer to compensate for instrument drift with time wherein a spectral feature shifts at least fractionally over the pixels (or in finite increments of spectral positions). (Unless otherwise stated, as used herein and in the claims the terms "wavelength" and "wavenumber" mean either actual wavelength or wavenumber or frequency, or spectral position (e.g. in pixel units) in a detector array or subarray.)

The computer 32 generally is conventional such as a Digital Equipment Corporation model 5100 incorporated into the instrument by the manufacturer thereof. The computer should include a central processing unit (CPU) 32 with appropriate analog/digital converters (in and/or out as required), memory sections 30 that may include a disk, a keyboard for operator input, and a monitor 36 and/or a printer for display of the desired output such as sample composition. Programming is conventional such as with "C++" generally incorporated into the computer by the manufacturer of the computer or instrument. Adaptations of the programming for the present invention will be readily recognized and achieved by those skilled in the art.

Figure 4:
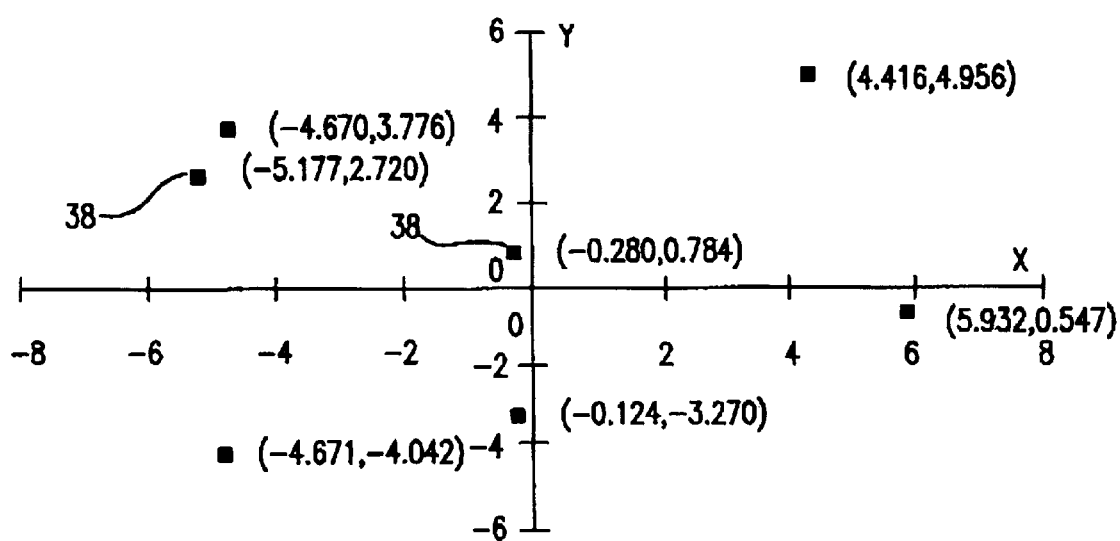
FIG. 4 shows a subset of selected subarrays having position coordinates on the detector of FIG. 2.

A drift standard, in the present embodiment being a mixed-element standard sample of known, fixed elemental composition, is introduced into the instrument, e.g. injected 20 into the ICP 14. It is not necessary to know the quantitative amounts of the compositions of the elements in this standard, other than that they provide an adequate ratio of signal to noise. The atomic elements for the composition are chosen for their distributed regions of spectral activity on the detector. An example is shown in FIG. 4, which shows a selected subset of the subarray positions 38 targeted by the proposed drift standard. Positions on the detector are defined by x and y coordinates of each selected subarray. A suitable standard may be formed, for example, from 8 common elements yielding 17 spectral lines. The number of selected subarrays in the subset may be substantially fewer than the total number of subarrays (e.g. 17 in the subset compared with 245 total).

With reference to a flow chart (FIG. 5), each subarray is assigned a reference point or zero position 48. The zero positions may be associated with hypothetical data which generally may be any arbitrarily selected spectral data for each pixel. Such data may be that acquired at the first time, or a theoretical or other good estimate of a design position and shape for a spectral feature at each array. Advantageously, however, the zero position simply is an arbitrary position of the subarray such as the center of the subarray.

Figure 6:
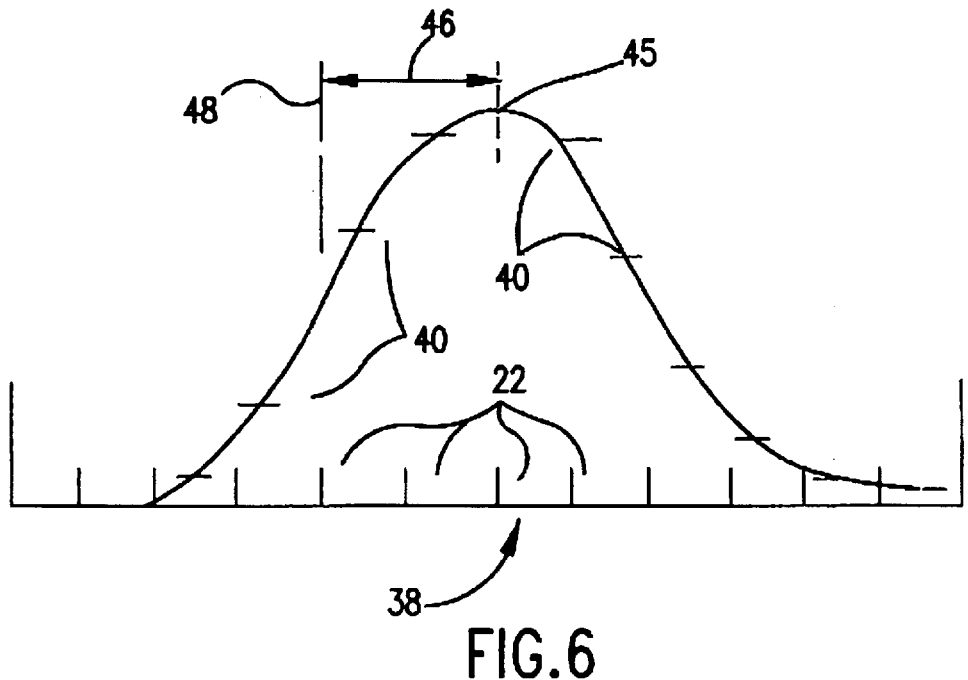
FIG. 6 shows a spectral feature associated with the flow diagram of FIG. 5.

A first set of spectral data 40 (also FIG. 6) is acquired 42 for the subset of selected subarray positions at a first time 43 for the drift standard 44. These data define peak locations 45 which are compared 46, generally by subtraction, with the zero positions 48 to obtain first offset data 50. These data generally will depend on position on the detector, and thereby are a function of the x-y coordinates 38 (FIG. 4) of the subarrays. The position coordinates may be an average for the subarray or for each pixel, the former generally being sufficient. A mathematical offset function 52 ("first offset function") is determined (computed) 54 from the first offset data such that a "pixel offset" O (real line position relative to the zero position) is defined for all of the subarrays as a function of any x and y position on the detector. The function may be in the form of an equation, e.g. offset O=ax+by+c where the parameters a, b and c define the function. The change in this mathematical function is used to predict the degree of spectral drift in pixel space (e.g. to as small as 0.01 pixel drift) as a function of any x and y position on the detector. Thus pixel drift is defined as the change in the pixel offset calculated as a function of x and y. Use of the offset equation simplifies standardization process by enabling drift for all subarrays to be determined, although only a subset is measured. A higher order equation may be used, but this generally should not be necessary.

To detect drift, a second set of spectral data 56 is acquired 42 for a drift standard 44 at a second, later time 60. The second standard and selected array positions 38 preferably (but not necessarily) are the same as the first. These data are compared 46 similarly with the zero position 48 to obtain second offset data 62. The latter is used to obtain 54 a second offset function 64 defining an offset for any array position at the second time. The difference 66 between the first and second offset functions 52, 64 provides a difference function 68 representing the spectral shift as a function of x-y position 38 during the interval. By interpolation 70 or extrapolation a spectral shift 72 may be obtained for any selected (third) time.

Spectral data 76 for a test sample 78 (typically unknown) acquired at a selected time ("time 3") 80 may be standardized 82 to any base time such as the first time 43, by application 74 of the spectral shift 72. For better accuracy the selected time should be between the first and second times for interpolation. This type of standardization is an option as shown by the broken lines in FIG. 5. The model (explained below, but unshifted) may be applied to the standardized data.

The standardization preferably is utilized in conjunction with application of a matrix model of calibration data applied to sample data. In such application, a conventional matrix model is obtained initially in a manner taught in the aforementioned U.S. Pat. No. 5,308,982 (Ivaldi et al, "Ivaldi patent"), incorporated herein by reference, and an article "Advantages of Coupling Multivariate Data Reduction Techniques with Inductively Coupled Plasma Optical Emission Spectra", by J. C. Ivaldi and T. W. Barnard, Spectrochimica Acta, 48B, 1265 (1993).

The matrix is formed of archival spectral data representing accurate, base data for known concentrations of one or a plurality of analytes expected to be found in test samples. The matrix is formed of columns of spectral data, each column being for one analyte. The matrix also should contain one or more columns for interferents which are other analytes and stray features not of direct interest, and a column representing background. Vertical position in the column represents pixel; there generally is a separate submatrix for each subarray to form the matrix model, although one large matrix for the subarrays is an alternative. The Ivaldi patent also teaches the inclusion of one or more mathematical derivatives in the matrix; however, as such derivatives are taught therein for correcting for spectral shift, they are not necessary in the present case which achieves the correction differently. Otherwise, however, the use of the matrix herein is essentially the same (but with different symbols):

$$[M] = \begin{bmatrix} a_1 & \cdots & b_1 & i_1 \\ \vdots & & \vdots & \vdots \\ a_k & \cdots & b_k & i_k \\ \vdots & & \vdots & \vdots \\ a_{16} & \cdots & b_{16} & i_{16} \end{bmatrix}$$

$$[R] = ([M]^T[M])^{-1}[[M]^T$$

$$[U] = \begin{bmatrix} u_1 \\ \vdots \\ u_k \\ \vdots \\ u_{16} \end{bmatrix}$$

$$[C] = [R][U]$$

where:

M is a model matrix of known analyte data $a_k$, background data $b_k$ and interferant data $i_k$ (where k is 1 to 16);

in R the superscript T indicates transverse operation, and the superscript −1 indicates inverse matrix operation within the parentheses;

U is a vector of spectral data $u_k$ for a test sample; and

C is a computed vector.

This example is for 16 pixels. The vector C includes a parameter $c_j$ representing a quantitative measure of a corresponding element in the test sample. The model is applied to the spectral data of the test sample using multiple linear regression by least squares.

This method with a matrix model (without the derivative of the aforementioned Ivaldi patent, and without modification according to the present invention) is basically similar to Kalman filtering, for example as disclosed in U.S. Pat. No. 5,218,553 (de Loos-Vollebregt et al), and in an article "Kalman Filtering for Data Reduction in Inductively Coupled Plasma Atomic Emission Spectrometry" by E. H. van Veen and M. T. C. de Loos-Vollebregt, Anal. Chem 63 1441 (1991) and previous articles referenced therein. Thus the present invention may be adapted to the Kalman filter format.

According to a preferable aspect of the invention (FIG. 5), before application of the matrix model to test spectral data, the matrix model 84 is shifted to the time (time 3) 80 of the acquisition of sample data 76. Thus the interpolated spectral shift 72 is applied 86 to the matrix model to effect a shifted matrix model 88. This shifted model is then applied 90 to the sample data 76 (taken at time 3). The result is a display 92 of the composition 94 of the test sample. For another test sample, the interpolation and shifting of the model is effected for the new time of the new data acquisition. Spectral data for the drift standard is updated as necessary for the new interpolation.

In developing the matrix model, inasmuch as the offset could drift during the (potentially lengthy) archive collection phase, there should be periodic updating of the current system conditions as determined by repeated use of the drift standard in the manner set forth above. This provides a pixel offset number for the spectrum at each subarray, to which all further measurements on that subarray will be referenced to determine drift. Thus, each spectrum (spectral data) gathered at a subarray will have an offset associated with it. If spectra of several analytes are collected between drift standard measurements, the amount of offset is apportioned by interpolation (e.g. linearly) to each of them as a fraction of the time elapsed. The base spectral data for the model may be formed by shifting each spectrum back to a common initial time according the offsets. Alternatively and preferably, the offset is saved with the archive model data and applied later.

Figure 5:
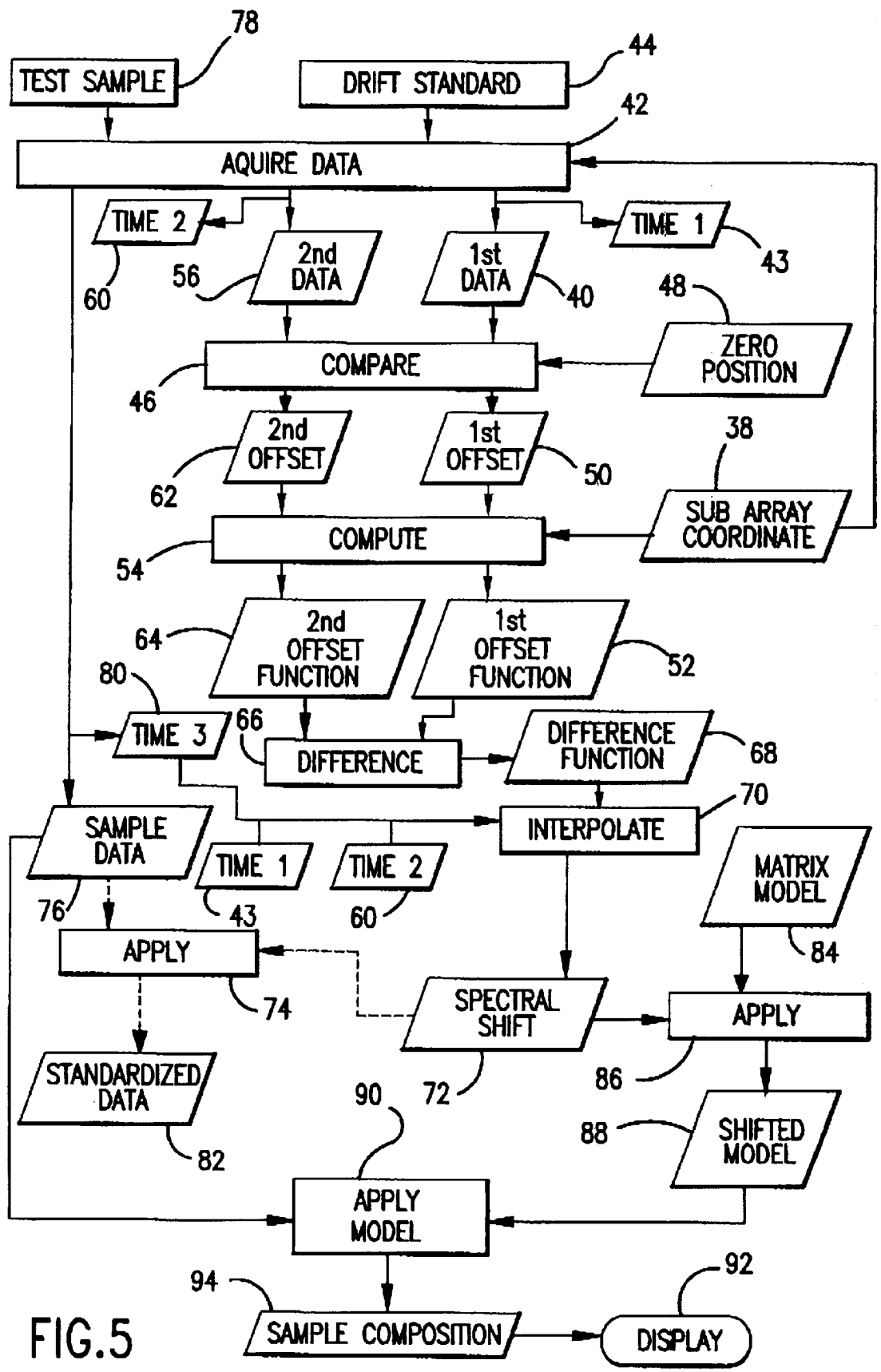
FIG. 5 is a flow diagram of steps and means for an embodiment of computations associated with the instrument of FIG. 1 according to the invention.
Figure 7:
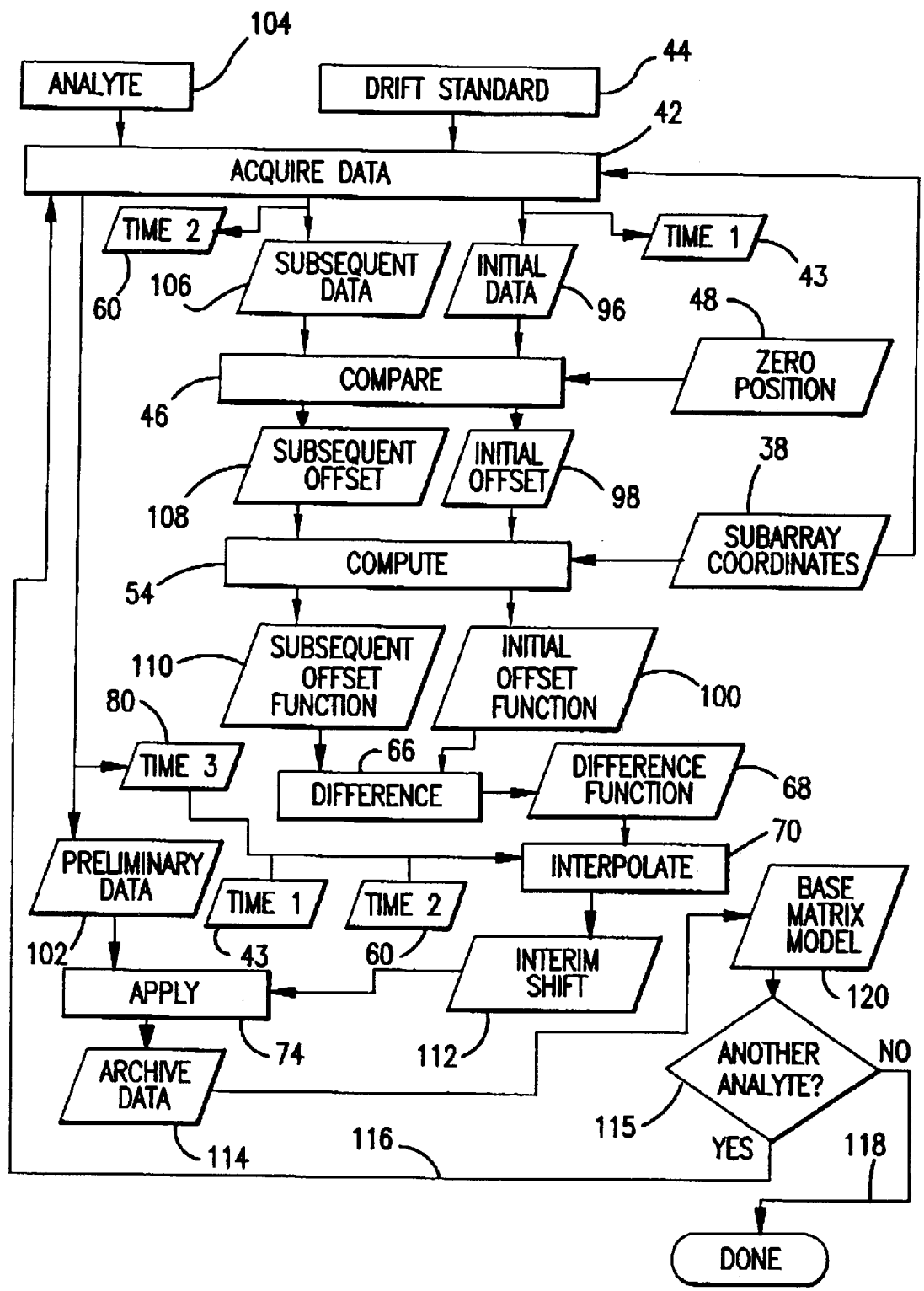
FIG. 7 is a flow diagram of steps and means for another embodiment of computations associated with the instrument of FIG. 1 according to the invention.

The obtaining of a matrix model (FIG. 7, with some numerals the same as in FIG. 5 for similar steps or operations) is similar to the initial procedures of FIG. 5. This starts with acquiring 42 initial spectral data 96 for a drift standard 44 at selected array positions 38 (FIG. 4) at an initial time (time 1) 43. The initial spectral data are compared 46 to a zero postion 48 (explained above) to obtain initial offset data 98, and the initial offset data are used to obtain (compute) 54 an initial offset function 100 defining an offset for any array position. Preliminary spectral data 102 then is acquired for a known concentration of the selected analyte 104 at an interim time (time 3) 80. Subsequent spectral data 106 for selected array positions is acquired 42 at a subsequent time (time 2) 60 for the drift standard 44, the subsequent spectral data are compared 46 to the zero postion 48 to obtain subsequent offset spectral data 108, and the subsequent offset data are used to obtain (compute) 54 a subsequent offset function 110 defining an offset for any array position. The difference function 68 computed 66 between the initial offset function and the subsequent offset function is utilized by interpolation 70 to obtain an interim spectral shift 112 for the interim time 80. The interim spectral shift is applied 74 to the preliminary spectral data 102 to effect the archive spectral data 114 which is stored for the base matrix model 120 associated with instrument conditions interpolated or extrapolated back to the initial time.

As explained above, the interim spectral shift may be obtained alternatively via differences between the initial and subsequent offset spectral data. Also, it will be recognized that the foregoing steps of FIG. 7 for obtaining the model are achieved in the manner of FIG. 5 by preliminarily identifying the first time as the initial time, the second time as the subsequent time, and the selected time as the interim time. An alternative in applying the shifts is to store all of the collected data for future computations of the shifts at the time of application of the matrix model to test sample data; the steps and means set forth herein and in the claims include this alternative.

Upon query 115, if there are more analytes 116 (and there normally are many), this procedure is repeated for each of these as well as interferents and the background until it is determined that the collection of archive data for the model matrix 120 is finished. At each drift measurement, if the drift is determined to be less than a preset standard, no correction is made. It is not necessary to use the drift standard after every analyte, and judgment should be exercised as to how often to use it, depending on early rate of drift or other known factors on instrument stabilization, particularly with regard to temperature stabilization. It is advantageous to collect and save each set of spectral data along with offset corrections interpolated back (in time) from periodic data acquisitions with the drift standard.

When the archive data determinations are finished 118, a final acquisition may be made with the drift standard for the final interpolations, and the computations are then made for the base matrix model 120. Alternatively, the conditions of the last spectral shifts may be used routinely without waiting for a processing from a later drift measurement. In such a situation, a later drift measurement may be made as an estimate of the degree of acceptability of the real-time results. In other words, a final result is computed and later validated upon measurement of drift to extablish whether such result has been within tolerances.

The spectral data are stored by pixel positions in the predetermined spectral increments of pixel size. It may be advantageous to utilize pixel position (or pixel number) to replace units of wavelength (or wavenumber), where the final output of the instrument is compositional information, with the spectral information being unnecessary. A small shift such as in drifting (e.g. from temperature change) will manifest as a small change in data levels in adjacent pixels. For the archive data collection of base spectral data for the matrix model, greater sensitivity is desired. For this, the instrument preferably is operated in a "high density" configuration, achievable by slit-scanning at a resolution of, for example, 4 intervals per pixel, whereby the entrance slit 17 (FIG. 1) is positioned incrementally 123 by a stepper motor 125. This enables the collection of reference spectra at a point spacing suitable for further mathematical manipulation.

With reference to FIG. 5, when the model is applied 90 to test spectral data, the base spectral data 84 of the model is shifted 88 as set forth above. However, it is only necessary to use the model data in the pixel increments, e.g. every fourth data point in the higher resolution model. Thus, in summary, although the test spectral data are acquired at predetermined increments (pixels) in associated subarrays, the preliminary spectral data for the model is obtained (and shift corrected for drifting during model archive acquisition) for a multiplicity of increments (e.g. 4) within each predetermined increment, and the shifted matrix model is applied with model spectral data chosen at the predetermined increments.

Initially, a large data base, or archive, of spectra encompassing all possible analytes, interferents and background anticipated for the unknown test samples is collected. These spectra generally are obtained one at a time for pure element standards at concentrations where the maximum signal to noise ratio is obtained for the spectra, as well as maximum revelation of spectral features, but without overlaps from different analytes. Typically 60 to 70 analytes of individual atomic elements (or selected molecules for molecular spectroscopy) may be measured to assemble the archive for the matrix model. The individual analyte samples used for the archive are not necessarily the same as the drift sample which generally is a collection of several analytes as described above.

All of the archival spectra could be adjusted to a common instrument condition. For example, the initial condition—which by definition has zero offset—might be chosen. Then, all spectra with finite offsets are shifted to the pixel they would have been centered on at the starting condition. Alternatively and preferably, the archival spectra and associated offset can be stored as-collected, and any shifting required can be deferred to the offset (drift) conditions defined at run time. Critical to its success is the ability to accurately represent the spectra of all of the components in the mixtures to be analyzed. Since these must be in correct wavelength registry (or pixel location), an optimum configuration occurs when all of these spectra are shifted to the conditions at which the run-time samples are collected, as determined by periodic use of the drift standard. Note that the run-time data does not need to (but may) be slit-scanned.

The offset corrections with the interpolations are applied using a conventional method such as the Savitzky-Golay technique taught in an article "Smoothing and Differentiation of Data by Simplified Least Squares Procedures" by A. Savitzky and M. J. E. Golay, Analytical Chemistry 36, 1627 (July 1964); five points are normally sufficient in the present example with the four interval slit scanning. After interpolation of the data the matrix model is assembled with every fourth point to correlate with pixel positions; i.e. with the first, fifth, ninth, etc. points. Other interpolation options include the conventional Lagrange and Fourier techniques.

Alternative Drift Standard

Figure 8:
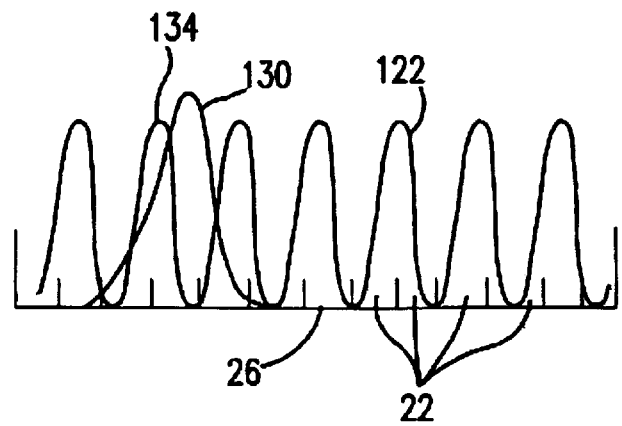
FIG. 8 shows a series of regular spectral peaks from an drift standard utilized for an aspect of the invention, and a superimposed spectral feature, associated with the flow charts of FIGS. 5 and 7.

For the drift standard, an alternative to a standard sample of analytes is an optical interference element for effecting a series of regular spectral peaks 122 (FIG. 8), such as a fringe pattern with a multiplicity of interference fringes or secondary peaks spaced regularly across the spectral band including portions in each subarray 26. Use of a fringe standard in the form of a "low finesse etalon" is disclosed in the aforementioned U.S. Pat. No. 5,303,165 ("Ganz patent"), the portions relevent to such etalon being incorporated herein by reference. Such a fringe standard is used in an embodiment of the present invention, with modified procedures as explained below.

Figure 9:
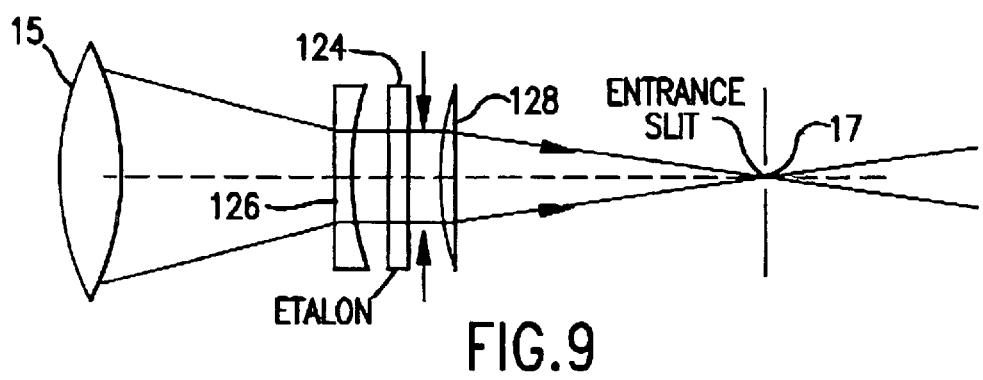
FIG. 9 is a schematic diagram of an optical train incorporating the drift standard of FIG. 8 into the instrument of FIG. 1.

Each secondary peak has an integer order number identifiable to a peak wavelength. A suitable fringe standard is a conventional Fabry-Perot low finesse etalon, advantageously an uncoated fused silica plate positioned ahead of the entrance slit to the dispersion system (e.g. gratings). ("Finesse" is defined conventionally as the ratio of spectral line spacing to line width in a series of regularly spaced interferometer fringe lines.) In the optical train (FIG. 1) a source of broad band ("white") light, e.g. from an incandescent filament or a sample-free plasma 18, is focused to the slit 17 by the input lens 15. For proper collimation, the etalon 124 (FIG. 9) in the optical train may be sandwiched between two proximate lenses 126, 128, and this group is positioned between the input lens and the slit. Rays from the first, concave lens 126 are rendered parallel, passed through the etalon, and reconverged with a second, convex lens 128 to be focussed on the entrance slit.

The low finesse etalon transmits the radiation in an interference fringe pattern forming a multiplicity of fringe peaks. The element has an index of refraction $n(\sigma,T)$ related to wavenumber $\sigma$ (reciprocal wavelength) and temperature T in a well-defined and well known relationship which generally is ascertained from handbook tables or from standard equations such as those of Sellmeier discussed in "Temperature-Dependent Sellmeier Coefficients and Chromatic Dispersions for Some Optical Fiber Glasses", by G. Ghosh, M. Endo and T. Iwasaki, J. of Lightwave Technology, 12, 1338, August 1994.

An integer order number m is identified to each peak wavenumber in accordance with the etalon thickness t by the standard fringe equation:

$$\sigma = m/[2n(\sigma,T)t] \qquad \text{Eq. 1a.}$$

where the parentheses indicate dependence of the refractive index n on wavenumber $\sigma$ and temperature T. Off-peak the order number is a non-integer. As an effective thickness t can be determined very accurately by procedures disclosed herein, the actual thickness need not be known accurately. Also, the procedures will average out nonuniform thickness and temperature-induced changes and account for slight misorientation of the etalon in the instrument, which may vary from time to time. More broadly, following nomenclature of the Ganz patent, Eq. 1 is a correlation function and 2t is a correlation constant.

The instrument is operated (FIG. 10A) with the low finesse ("LF") etalon 124 to acquire 131 secondary spectral data 129 representing the fringe ("secondary") peaks which have peak locations 122 (FIG. 8) ascertained with respect to pixels. Eq. 1a is utilized in conjunction with data also acquired 42 for an accurately known wavelength of a known peak 130 (or its centroid equivalent) such as a well known sharp absorption line from a known standard sample 133, a special lamp in the instrument, or an internal wavelength standard (e.g. Nd:YAG crystal taught in the Ganz patent) substituted for the low finesse etalon 124 in the optical train of FIG. 9 to produce primary spectral data 132 representing the well defined primary spectral peak 130 having an identified (absolute) wavenumber. The primary peak must be in one of the subarray positions which becomes a calibration subarray and conveniently is one of the selected subarray positions. The peak source operates as a calibration source to accurately locate the fringe peaks initially with respect to the pixel locations.

Up to this point the procedure is similar to that of the aforementioned Ganz patent which is utilized with a continuous array detector and discloses a related procedure for determining etalon thickness, with fringe order number determined by counting fringes. Although described herein with respect to peaks, fringe valleys may be used instead as disclosed in the Ganz patent and may be deemed peaks for the present purpose. If the present invention is applied to a continuous array detector, the further procedures of the Ganz patent for determining order number, etalon thickness, and consequent peak wavelength may be followed. However, a fringe count cannot be achieved for a detector with segmented subarrays for which the present invention is useful, so an alternative procedure is needed.

In such alternative, present procedure, the nearest fringe peak 134 that overlaps the pixel in a subarray containing the standard peak having wavenumber $\sigma_0$ is identified 136 and fitted to determine the precise phase of the fringe peak relative to the standard peak. The location of this part of the fringe at the line peak is at an order number $m_i + \delta m$ where $m_i$ is an integer (for the near fringe peak) and $\delta m$ is a fractional part of the order number. Eq. 1a becomes:

$$m_i + \delta m = 2n(\sigma_0, T) t \sigma_0 \qquad \text{Eq. 1b}$$

An initial estimate 138 of etalon thickness $t_e$ is made with a specified accuracy range $\delta t$ for the possible thickness range, providing an initial minimum thickness $t = t_e - \delta t$. An initial $\delta m$ also is estimated 140 (from the phase), allowing calculation 142 from Eq. 1b and the known $\sigma_0$, of a tentative $m_i'$ (generally not an integer) for the minimum thickness. A nearest integral value is determined 144 for $m_i$, and a corresponding thickness t then is calculated 146 from Eq. 1a, providing a first t,$m_i$ pair 147. Subsequent integers $m_i$ are listed 144 with corresponding thicknesses t calculated up to the maximum thickness $t = t_e + \delta t$. For example, $\sigma_0 = 3.7707391 \times 10^4$ cm$^{-1}$, n=1.50023 for fused silica at this wavenumber and temperature T=26° C., thickness is estimated $t_e$=500 $\mu$m with $\delta t$=10 $\mu$m, and initial $\delta m$=0.25 $\mu$m. Then for t=490, $m_i'$=5543.586 with a nearest integer $m_0$=5544 and a corresponding t=490.0366. The next integer is $m_i$=5545 with a calculated t=490.125. This is continued until t=510 (approximately), resulting in a set of an initially large number of wavenumber-thickness ($m_i$,t) pairs 147. It will be recognized that the first calculation may be made for any thickness in the estimated range +/-$\delta t$, and subsequent integers listed for thickness above and below the first thickness; with respect to the claims, such variation in procedure is to be deemed equivalent to that described above. Since the index of refraction changes faster in the deep UV spectrum, it is better to perform the thickness measurements at higher wavelengths where temperature induced variations from normal table values will be less significant.

To narrow the choice (FIG. 10B), another subarray is selected. For this, another line at another wavelength may be used, but only semi-accuracy is necessary, being obtainable from nominal instrument calibration or design, or the equivalent such as a standard sample of known analytes. Accuracy to one pixel is sufficient. In the new subarray, secondary (fringe) data 150 is acquired 148, a sinusoid is fitted to the this data, and a fringe peak 152 is selected 154 in a pixel having a wavenumber $\sigma$ known from the nominal calibration or a known peak in the subarray. Thickness values t from the first list of pairs are used to calculate 156 corresponding peak order numbers m within a fraction of a fringe uncertainty. An uncertainty of one pixel corresponds to a fraction of a fringe that can be calculated after the fit. The m values estimated from the thicknesses tried (that had passed from the previous stage) all must be an integer to within this fraction of a fringe to pass the current test.

Since only integral order numbers $m_i$ are correct, non-integers 160 are determined 158 to eliminate many pairs, and the remaining t,$m_i$ pairs 164 are substantially reduced. ("Non-integer" is to a predetermined level of precision.) This process is repeated 166 (if necessary) for one or more other subarrays until only one pair is found 168, thereby establishing the effective etalon thickness t (or correlation constant 2t). Corresponding order numbers $m_i$ can then be selected and precise corresponding wavenumbers calculated from Eq. 1a. It has been found that only three subarrays may be needed to converge to a unique answer. Once thickness is known, several known lines are measured to account for variations in the index and insufficient collimation.

The true thickness of the etalon is determinable only to the extent that both the index of refraction and the calibration line are precisely known. Even when both parameters are assumed to be accurate, uncertainties in the optical setup such as insufficient collimation at the etalon may slightly alter results. A manner of correcting for such uncertainties, including the slight error possible in the thickness determination, is to use the thickness t determined as set forth above, and an index of refraction that has been adjusted so that $n_a = n_o + \delta n$ where $n_a$ is an adjusted index of refraction derived from the initially estimated index $n_o$ and a correction $\delta n$ to the index, and is dependent on wavenumber. A way to implement such a correction is to use a small number of additional standards with known emission lines and compute $\delta n$ values for each of these lines so that the order number will be what is actually observed for an estimated thickness. This correction may be plotted for a reasonable spread of lines, and a continuous function may be fitted to the data so that indices may be deducted for regions not directly measured. This correction is likely to be most important in the deep ultraviolet (UV) region where the index of refraction for silica increases significantly as wavelength decreases. A mercury lamp is suitable for producing lines in the range of interest.

With an etalon or the like substituted for a standard sample of selected analytes, the procedures for drift corrections are the same as for the standard samples, both in assembling archive data for the basic matrix model and in shifting the model to current conditions. Selected fringe peak data are identified as certain spectral data. Thus, in effecting the base spectral data for the model, initial spectral data are acquired at an initial time for the selected sinusoidal peaks with the etalon for the selected subarrays, the initial data are compared to the zero position, preliminary spectral data for the model is obtained for known concentrations of selected analytes, subsequent spectral data are acquired with the etalon at a subsequent time and compared to the zero position, and the preliminary data are shifted by interpolation with offset functions back to the initial time. Then, before and after data acquisition for test samples, first and second spectral data are taken with the etalon drift standard, spectral shift is determined, the matrix model data are shifted accordingly to the time of the test data, and the model is then applied to the test data. In recognition of the "absolute" nature of the etalon data, for this embodiment of the invention it may be desirable to reference the spectral data to wavenumber (or wavelength) rather than pixel position as for analyte drift standards. In this case, comparisons with zero position would be omitted.

Temperature Correction

In addition to changes in the spectrometer itself arising from thermal expansion or contraction of the materials forming the instrument, temperature also affects the etalon by changing the index of refraction and thereby the fringe pattern. Two sets of information are required, namely an estimate of temperature at the etalon, and a degree of correction in the refraction index as a function of temperature. These may be determined in a series of steps. Data are taken at two levels of operational temperature (at least at the etalon), e.g. 2° C. apart, held constant at each level. As the etalon will have changed thickness, its effective thickness should be determined at each temperature by the foregoing procedures (taking into account that the previous value probably is close, e.g. within 1 $\mu$m compared to 10 $\mu$m accuracy originally). Despite the change in index of refraction, an estimated index $n_0$ may be used for both thickness determinations.

At both temperatures the procedure is effected for $n_a$ by taking data for multiple lines, and two curves (or corresponding data in computer format) are derived to describe the effective index of refraction as a function of wavelength for both the initial and subsequent locations of the spectral peaks at the two temperatures. The peaks should include at least one line in the deep UV where the index is more sensitive to temperature. This UV line serves as a "thermometer" since it shifts relative to the etalon peaks with temperature, moving to an apparent wavelength away from its expected value. The initial and subsequent index curves are subtracted to provide the change in index as a function of wavelength for the temperature change. The changes (over wavelength) are divided by the degree of spectral shift for the peaks in the deep UV, to effect a set (or function) of slopes representing changes in index over wavelength relative to the shift in the "temperature" line. This information is stored for future use. Then, in ordinary operations, the "thermometer" line is observed periodically, its shift is determined, the change in refractive index $\delta n$ is calculated from the slopes, and the changes are added to the nominal index $n_o$ to establish the adjusted index of refraction n for the etalon as a function of wavelength.

Figure 10A:
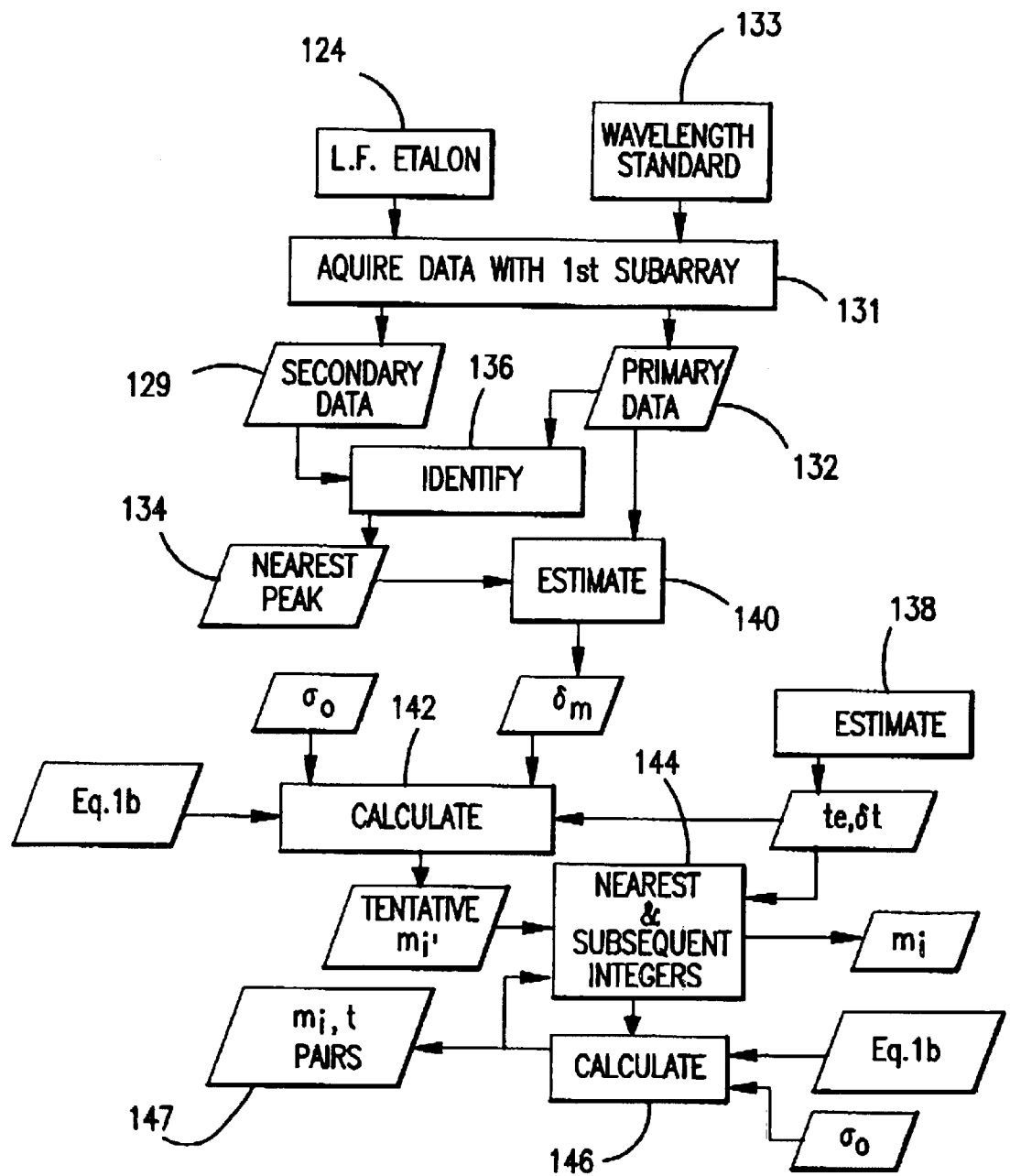
FIGS. 10A and 10B are flow diagrams of steps and means for utilizing the drift standard of FIG. 8 according to the invention.
Figure 10B:
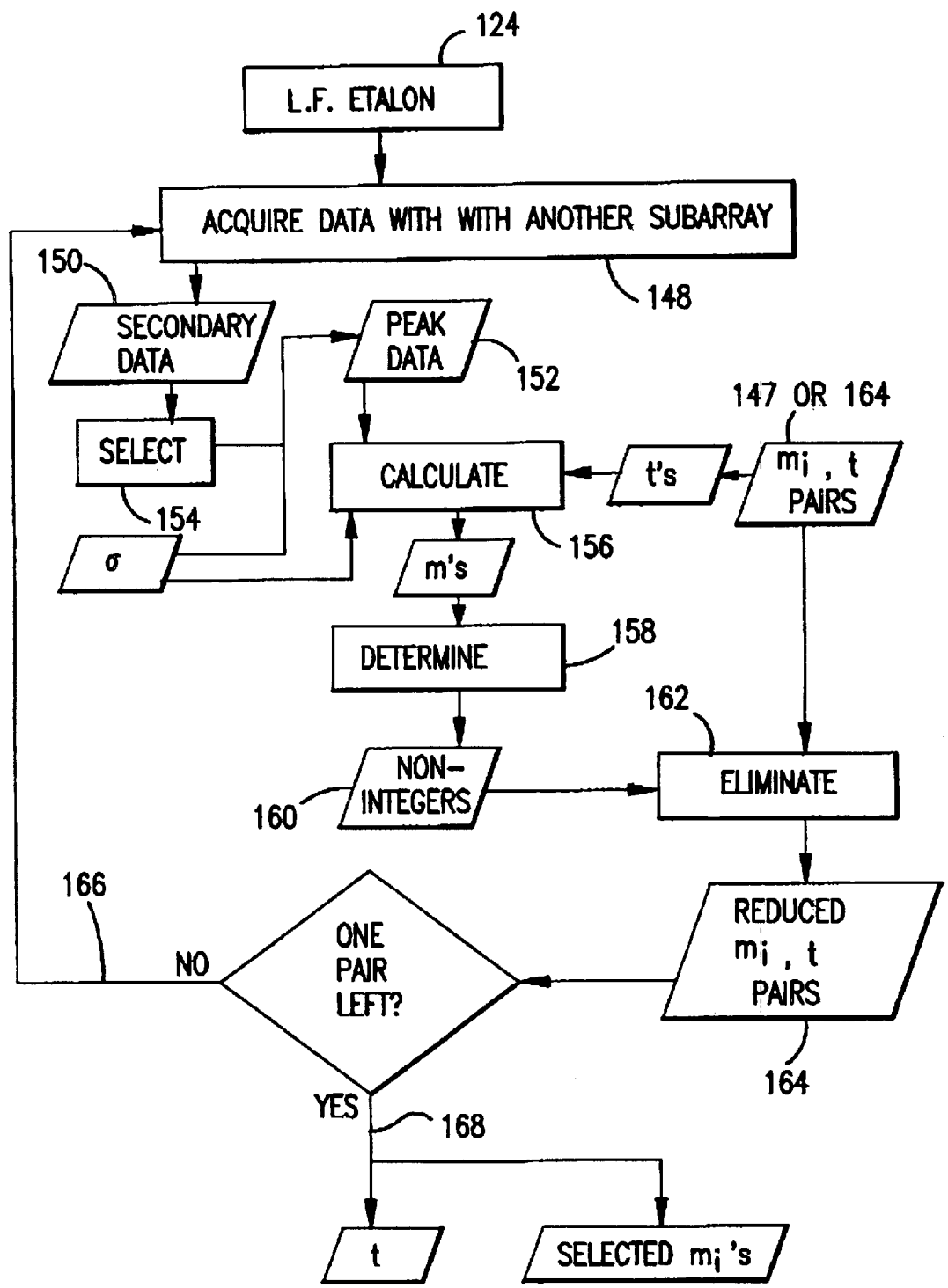
Figure 11:
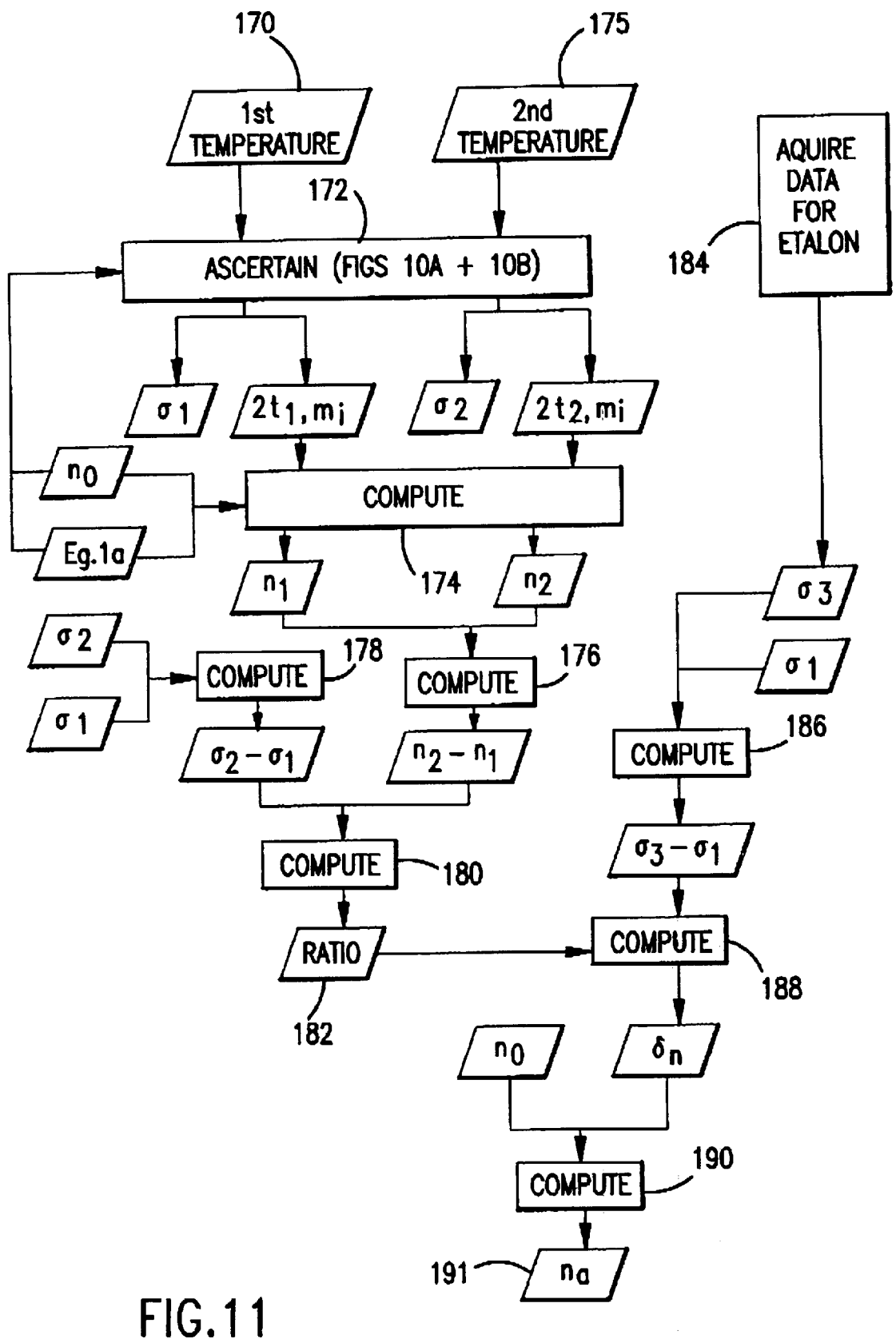
FIG. 11 is a flow diagram for temperature correction utilized in conjunction with FIGS. 10A and 10B.

A procedure (FIG. 11) may be utilized for temperature correction where the correlation function is dependent on index of refraction of the interference element, the index is dependent on temperature and subarray position, and the primary peak has a spectral position representative of temperature. While maintaining the interference element at a first temperature 170, the procedures described with respect to FIGS. 10A & 10B and Eq. 1a are effected 172 with a predetermined nominal index of refraction $n_0$ to ascertain first primary spectral data defining an associated first primary peak position (e.g. having wavenumber $\sigma_1$), a first effective correlation constant $2t_1$ and associated order numbers $m_i$. First values of the index of refraction $n_1$ are computed 174 with the correlation function (Eq. 1a) using the first effective correlation constant and associated order numbers, the first values being dependent on the nominal spectral positions for the selected subarrays. While maintaining the interference element at a second temperature, the procedures described with respect to FIGS. 10A & 10B are repeated 172 with the nominal index to ascertain second primary spectral data defining an associated second primary peak position $\sigma_2$, a second effective correlation constant $2t_2$ and associated order numbers $m_i$. Second values of the index of refraction $n_2$ are computed 174 with the correlation function using the second effective correlation constant and associated order numbers, the second values being dependent on the subarray positions. A value difference $n_2-n_1$ between each first value of the index and its corresponding second value is computed 176 for each corresponding subarray position, a position difference $\sigma_2-\sigma_1$ between the first primary peak spectral position and the second primary peak spectral position is computed 178, and a difference ratio $R=(n_2-n_1)/(\sigma_2-\sigma_1)$ of each value difference to the position difference is computed 180. The resulting set of difference ratios as a function of subarray position is stored 182.

At any selected time in which data are taken with the etalon at a generally unknown temperature, subsequent primary spectral data are acquired 184 to define an associated subsequent primary peak position $\sigma_3$. A subsequent difference $\sigma_3-\sigma_1$ between the subsequent primary peak position and the first primary peak position is computed 186 as a measure of temperature change. A multiplication product $\delta n=(\sigma_3-\sigma_1)*R$ of the subsequent difference and each corresponding difference ratio 182 is computed 188 to effect corrections in the index of refraction, and totals $n_0+\delta n$ of the changes and the nominal index of refraction are computed 190 and stored 191 to effect a temperature-corrected index of refraction $n_a$ for each of the selected subarray positions. The corrected index is then utilized in the correlation function for computing the spectral position (or wavenumber or wavelength) for the selected secondary peak in each selected subarray, in accordance with FIGS. 10A & 10B.

Magnification

As set forth above, slit scanning or the like is desirable to provide more points than allowed by the ordinary pixel size. This is used particularly for developing archive data for the matrix model, while the test data are acquired ordinarily in full pixel increments. More generally, the test spectral data, as well as the first and second spectral data, are acquired at predetermined intervals (e.g. pixels) in associated subarrays, the preliminary spectral data are obtained for a multiplicity of sub-increments smaller than the predetermined increments, and the shifted matrix model is applied with model spectral data culled for the predetermined increments.

In slit scanning, the entrance slit 123 (FIG. 1) is shifted laterally by a stepper motor 125 to move a spectral feature by selected sub-increments (fractions) of a pixel on a subarray, for example, 4 sub-increments per pixel. Essentially equivalent scanning may be achieved by other means such as moving a lens or reflector in an optical train using a fixed slit. A full spectrum for all pixels is usually taken at each sub-increment, and the spectra are combined later to effect the actual sub-increment spectral data. The total number of sub-increments must be either spaced integrally or spaced with known intervals, requiring stepper motor action to be selected very accurately, i.e. precise knowledge of the amount of slit sub-increment is important. Any error results in an effective axis shift for the data. A corresponding correction factor for spectral position, called "magnification", should be made as close to one as practical, or errors develop in measurements of wavelength shifts. If the axis shift or magnification can be determined, it can be used with the scanning means (for example, stepper motor intervals) to correct the slit-scanning interval. The magnification (correction factor) is applied to the base spectral data to effect axis-corrected base spectral data in the base matrix model.

If a system has, for example, precisely 40 steps of the slit to move one pixel, then for four sub-increments per pixel, data collected at 10 step intervals would be precisely 0.25 pixel apart. However, systems generally may have a slightly different, predetermined, non-integral number of slit scans per pixel, e.g. 40+$\epsilon$ where $\epsilon$ is a fraction. The four scans separated by 10 steps then would not cover one pixel, so that the net effect on the overall spectrum of combination of the 4 slit-scanned spectra would be a nonuniformity of the spacing, since the spectra would be located at displacements of 0, 10, 20 and 30 steps in each pixel. To coincide exactly with the next pixel would take an extra $\epsilon$ fractional step. By determination of the exact number of steps to cover one pixel, a more accurate representation of the slit-scanned spectrum may be obtained.

Figure 12:
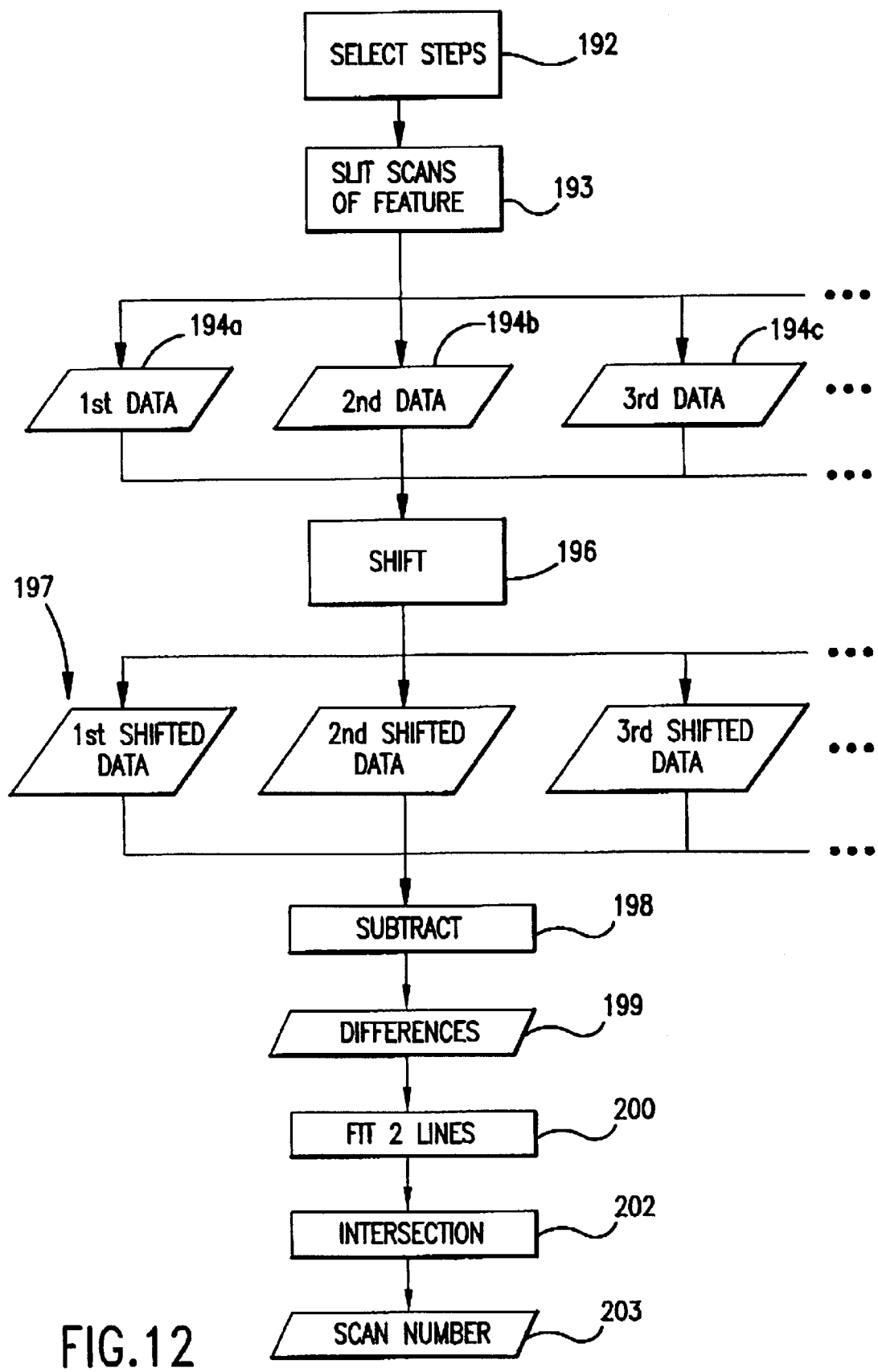
FIG. 12 is a flow diagram for adjusting magnification in a slit scanning embodiment incorporated into FIG. 1.

There are several ways to determine the magnification which is used to correct the scanning sub-increments to effect an integral total. In one embodiment (FIG. 12), the slit is scanned preferably in smaller sub-increments or intervals than for normal slit scanning, for example 2 or 5 or 10 times smaller than normal. The number of slit steps should traverse at least one pixel from a nominal start position. For example, for a normal slit scanning in four sub-increments, an integral, nominal total number of 40 intervals or steps per pixel may be selected 192 as an approximation of the predetermined number. Based on this, a set of auxiliary total numbers of steps above and below nominal total is selected, the set defining a series of multiplicities of sub-increments. The multiplicities (also denoted "index numbers") range smaller and larger in number than the nominal total, e.g. from 30 to 50. The scanning of each series in this example may be in increment steps of two pixels, i.e. 30, 32, 34, etc. up to 50 sub-intervals per pixel.

Slit scans 193 of the subarray are made for each series of index numbers on a selected pixel that should have a prominent feature (preferably a peak) from a sample, to acquire corresponding spectral data. Each scan (e.g. for 30, 32 etc.) produces a separate data series (first data 194*a*, second data 194*b*, third data 194*c*, etc.) across the pixel. Each original data series is pixel-axis shifted mathematically 196 by one pixel to effect first, second, third, etc. shifted data series 197. This data then is subtracted 198 from its corresponding shifted data (or equivalent vice versa). Differences 199 may be presented actually as-is or, advantageously, are determined in a form of standard root sum of squares (rss) of the actual differences. As the index number approaches the actual number (e.g. approximately 40) of scan steps to cover one pixel, the rss decreases. For example if the actual number is exactly 40, the rss would be zero for that index number and positive for 39 and 41. However, in general, there may not be an integral number of scan steps per pixel.

To ascertain the actual (generally non-integer) number of scan steps, the rss data vs. index numbers are fitted 200 to two straight lines. One line is determined with index numbers below the nominal index (e.g. 40), and the other line is determined with index numbers above the nominal index. These two lines will have opposite slopes and will intersect 202 each other at the point of zero rss. The lines also should cross the axis at the same point but, if there is a small error, the mean location may be selected. The point defines the actual number 203 of slit scans per pixel. The ratio of the actual number to the nominal number defines the magnification.

A check may be made with another pixel, advantageously the adjacent pixel at the nominal start position. The scans in this case thus may be made in the opposite direction beginning at the nominal start position.

The foregoing, although effective, is slow due to the large number of scans. An alternative approach utilizes ordinary spectral data collection, with a derivative correction to wavelength shift. In a simple Taylor series approximation:

$$y(x+\delta x)=y(x)+\delta x(dy/dx) \qquad \text{Eq. 2a}$$

where y is spectral data and x is wavelength (or equivalent pixel or sub-increment position). In a discrete numerical embodiment for a spectrum there is a function:

$$Y_1=aY_0+b(dY_0/dX_0)+e \qquad \text{Eq. 2b}$$

where the Y's are spectral data vectors, $Y_1$ is newly measured spectral data (possibly shifted by instrument drift) for a spectral feature, $Y_0$ is conveniently selected as the data for the original unshifted archival data for that feature such as in the matrix model, and $X_0$ is spectral position in a subarray. The measured data (subscript "1") conveniently (but not necessarily) are unscanned pixel data, whereas the archive data (subscript "0") may be in a higher (slit-scanned) density in sub-increments (e.g. 4 per pixel). (Data for $Y_1$ could be data at pixel intervals of the archival data.) To apply the equation the archive data should be "thinned" to the same density as the measured data (one point per pixel) for data fitting to the equation. The derivative $dY_0/dX_0$ may be taken at the high density and then thinned, or may be taken from the thinned data. The parameters a and b together represent the shift in spectral position (wavelength) as a parameter ratio b/a. The parameter e is the fitting residual.

The axis shift associated with an axis magnification deviating from one may be determined by trial and error. A tentative magnification is estimated, advantageously assumed to be 1.00. The apparent shift b/a is computed with Eq. 2b for a plurality of subarrays, for example the same selected subarrays used for determining the offset data so that no new data are required. When the correct magnification is used, these shifts are proportional to the size of the slit-scan steps. With a straight line fitted between b/a and the size, for all of the selected subarrays, the root-mean-square (rms) of the fit gives an indication of the deviation from the correct magnification. This rms may be large at the beginning before the correct magnification is approached.

To correct this a corrected magnification is estimated, e.g. varied from 1.00. The size of spectral position $X_0$ sub-increments are adjusted by the magnification to effect adjusted spectral data. Eq. 2b is applied again, and the parameter ratios b/a vs. step size are refitted to a straight line. This is repeated until the rms is minimized. Trial and error may be replaced by an algorithmic method such as the conventional bisectional search. Alternatively a number of calculations could be made with a range of magnifications and the one with the smallest error selected. The magnification generally will be a function of the x, y coordinates of the subarrays, as for the offsets.

Figure 13:
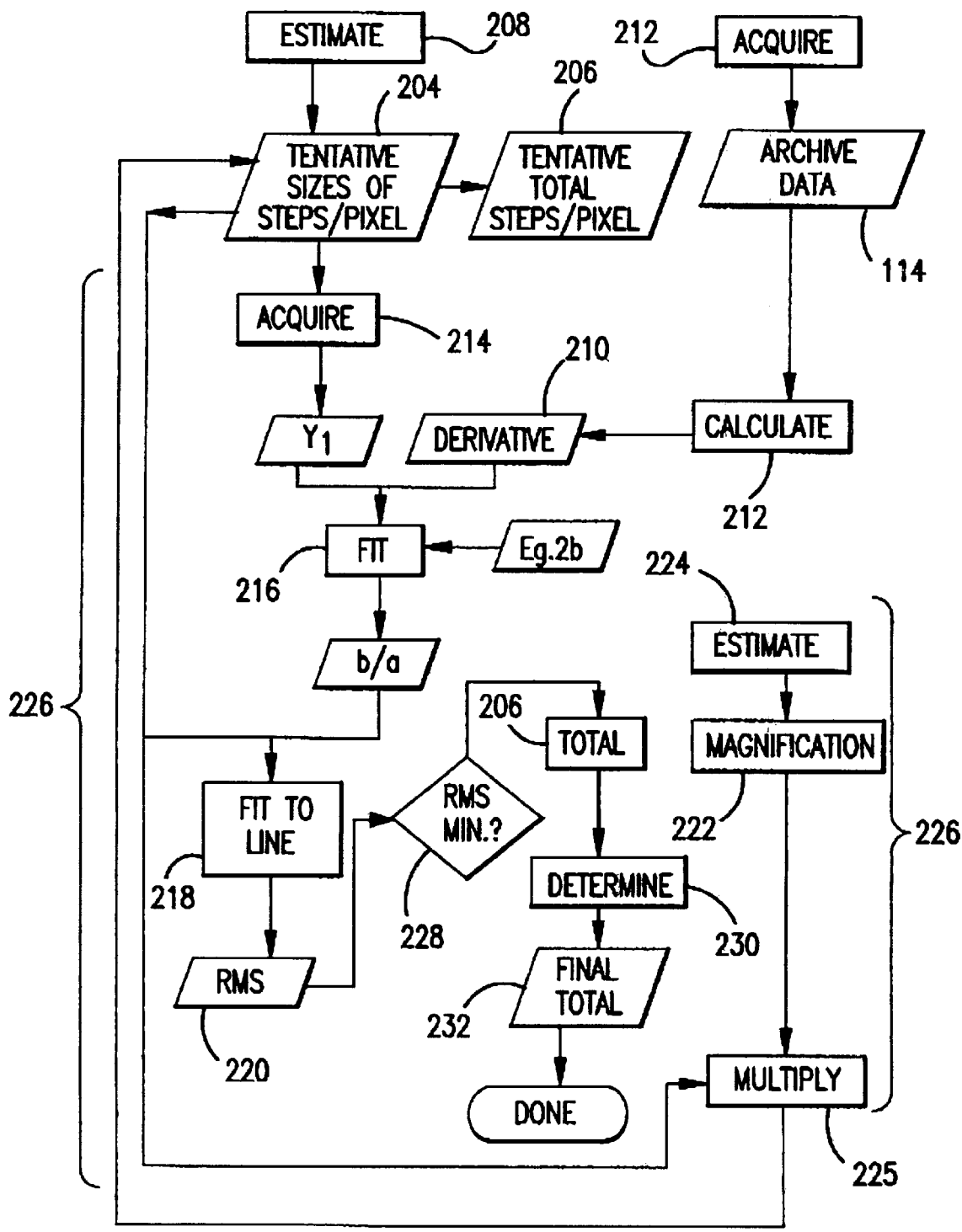
FIG. 13 is a flow diagram for adjusting magnification in an alternative slit scanning embodiment incorporated into FIG. 1.

More specifically (FIG. 13), a tentative size of the sub-increments (steps) 204, and a corresponding tentative totals 206 of sub-increments in a pixel increment, are estimated 208 for each of the selected subarrays. These generally will depend on subarray on the x,y positions. Spectral data for the derivative is acquired 212 either at this time or, preferably, as previous archive data 114, and the derivative 210 is calculated 212. Current spectral data $Y_1$ is acquired 214 for each of the selected subarrays and tentative steps. The current data and derivative are fitted 216 to Eq. 2b to compute the apparent shift b/a. The latter vs. the tentative sizes 204 of sub-increments for the selected subarrays are fitted 218 to a curve to establish a deviation from a straight line, the "curve" advantageously being a straight line with computation of the root mean square (rms) 220 of the deviations. Based on this rms, a corrected magnification 222 (variation from 1.00) is estimated 224. This is multiplied 225 by the previously estimated sizes 204 of sub-increments to yield new tentative sizes and totals 206. The sequence is repeated 226 until, on query 228, the rms is minimized to within a preselected level, at which time the last tentative total 208 is determined 230 for the final total 232.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A method for analyzing spectral data in a spectrometric instrument including a dispersion element and a detector receptive of dispersed light from the element, the detector having a plurality of detecting subarrays, with each subarray being at a different position on the detector; the method comprising steps of:

acquiring first spectral data for a drift standard for selected subarray positions at a first time;

comparing the first spectral data to a preassigned zero position for each selected subarray to obtain first offset data;

acquiring second spectral data for a drift standard for selected subarray positions at a second time;

comparing the second spectral data to the zero position for each selected subarray to obtain second offset data; and utilizing the first offset data to obtain a first offset function defining an offset for any subarray position, using the second offset data to obtain a second offset function defining an offset for any subarray position, and utilizing the difference between the first offset function and the second offset function to obtain a spectral shift for any subarray position at any selected time relative to the first time.

2. The method of claim 1 wherein the drift standard for the second spectral data is the drift standard for the first spectral data, and the selected subarray positions for the second spectral data are the selected subarray positions for the first spectral data.

3. The method of claim 1 wherein the selected time is between the first time and the second time, and the spectral shift is obtained by interpolation between the first offset function and the second offset function.

4. The method of claim 1 wherein the detector has a detector surface, and the detecting subarrays constitute a small portion of the detector surface.

5. The method of claim 4 wherein the selected subarrays are substantially fewer in number than the plurality of detecting subarrays.

6. The method of claim 1 further comprising acquiring test spectral data for a test sample at the selected time, and using the spectral shift to standardize the test spectral data to hypothetical instrument conditions.

7. The method of claim 1 further comprising the steps of obtaining a base matrix model formed of base spectral data for at least one selected analyte, acquiring test spectral data for a test sample at the selected time, using the spectral shift to shift the base spectral data so as to effect a shifted matrix model associated with instrument conditions at the selected time, and applying the shifted matrix model to the test spectral data so as to yield a parameter representing concentration of the selected analyte.

8. The method of claim 1 wherein, to obtain a base matrix model formed of base spectral data for at least one selected analyte, the matrix model being for use with the test spectral data so as to yield a parameter representing concentration of the selected analyte, the method further comprises identifying the first time as an initial time, the second time as a subsequent time, and the selected time as an interim time, obtaining preliminary spectral data for each selected analyte at the interim time, effecting the steps of acquiring, comparing and utilizing to obtain the spectral shift as an interim spectral shift for the interim time, and applying the interim spectral shift to the preliminary spectral data to effect the base spectral data for the base matrix model associated with instrument conditions at the initial time.

9. The method of claim 8 wherein the test spectral data are acquired at predetermined increments in associated subarrays, the preliminary spectral data are obtained for a multiplicity of sub-increments smaller than the predetermined increments, and the shifted matrix model is applied with model spectral data culled for the predetermined increments from the preliminary spectral data.

10. The method of claim 9 wherein the subarrays are each formed of a plurality of photosensitive pixels with a predetermined number of increments in each pixel, the increments being effected by slit-scanning with the instrument.

11. The method of claim 10 wherein the multiplicity of sub-increments are effected by the slit-scanning, the predetermined number is generally non-integral, and the method further comprises steps of determining an axis shifting of spectral positions attributed to the predetermined number being non-integral, and using the axis shifting to correct for the predetermined number being non-integral.

12. The method of claim 13 wherein the step of determining the axis shifting comprises further steps of:

selecting an integral nominal number approximating the predetermined number, and a series of multiplicities of sub-increments for the nominal number and auxiliary numbers of sub-increments, the auxiliary numbers being smaller and larger than in the nominal total;

acquiring spectral data for a selected spectral feature across a preselected pixel for each of the selected multiplicities to effect an associated original data series;

shifting each data series in spectral position by one pixel to effect corresponding shifted data series;

subtracting each original shifted data series from its corresponding shifted data series to effect a first set of differences for the smaller auxiliary numbers and a second set of differences for the larger auxiliary numbers;

fitting the first set of differences to a first straight line and the second set of differences to a second straight line; and ascertaining an intersection point for the first straight line and the second straight line, whereby the intersection point has a displacement determinative of the axis shifting.

13. The method of claim 11 wherein the step of using comprises determining a correction factor from the axis shifting, and applying the correction factor to the base spectral data to effect corrected base spectral data for the base matrix model.

14. The method of claim 12 wherein spectral data are related by a function $$Y_1 = a_0 Y_0 + b(dY_0/dX_0) + e$$

where $Y_0$ is derivative spectral data for sub-increments having an increment size corresponding to the tentative total, $Y_1$ is increment spectral data for the sub-increments, $X_0$ is spectral position in the sub-increments, $dY_0/dX_0$ is a derivative, a and b are parameters such that a parameter ratio b/a represents a tentative axis shift, and e is a fitting residual; the method comprising steps of:

(a) estimating a tentative sub-increment size corresponding to an estimated tentative total for each of the selected subarrays;

(b) acquiring derivative spectral data, and further acquiring increment spectral data using the tentative increment size, for each of the selected subarrays;

(c) fitting the derivative spectral data and the increment spectral data to the function to compute the parameter ratio for each of the selected subarrays;

(d) fitting the increment size and the parameter ratio to a curve to ascertain deviation of the curve from a straight line;

(e) using the deviation to estimate a corrected magnification corresponding to axis shifting; and (f) repeating steps (b) through (e) until any deviation from a straight line in step (d) is less than a preselected limit, thereby effecting the integral total.

15. The method of claim 1 wherein the drift standard is a standard sample containing at least one analyte to effect a spectral peak in each of the selected subarray positions.

16. The method of claim 1 wherein the drift standard is an optical element receptive of a light source to effect a series of regular secondary spectral peaks related to spectral positions within each of the selected subarray positions.

17. The method of claim 16 wherein the instrument has a nominal calibration for spectral position versus spectral positions in the subarrays, the instrument further includes a calibration source of a primary spectral peak having an identified spectral position, each secondary peak has an integer order number identified by correlation function to a peak spectral position in accordance with a correlation constant and a predetermined index of refraction of the interference element; and, to relate the secondary spectral peaks to spectral positions, the method further comprises:

(a) acquiring primary spectral data for the primary peak in a first subarray position, and secondary spectral data for secondary peaks in the first subarray position and in other selected subarray positions;

(b) estimating an initial correlation constant and a specified range thereof;

(c) with the correlation function, and the identified spectral position, and the initial correlation constant, calculating a tentative order number, and selecting a nearest integer order number to the tentative order number;

(d) with the correlation function, the identified spectral position and the nearest integer order number, calculating a corresponding first correlation constant to thereby effect a number-constant pair consisting of the nearest integer order number and the first correlation constant;

(e) recalculating a corresponding correlation constant with a new order number constituting said nearest integer order number shifted by one to thereby effect a further number-constant pair consisting of the shifted order number and the corresponding correlation constant;

(f) repeating step (e) with further integer order numbers shifted by additional ones until a full set of number-constant pairs is effected for the specified range of correlation constant;

(g) in another selected subarray, identifying a secondary spectral peak of the secondary spectral data to a nominal peak spectral position determined by the nominal calibration;

(h) with the correlation function, the nominal peak spectral position and each correlation constant of the set, computing further order numbers to effect additional number-constant pairs;

(i) designating all correlation constants in the additional pairs associated with order numbers that are non-integers, and deleting all number-constant pairs from the full set having the designated correlation constants, thereby reducing the set of number-constant pairs;

(j) repeating steps (g), (h) and (i) until a single correlation constant in the pairs of the set remains to establish an effective correlation constant and corresponding remaining integer order numbers for the calibration subarray and each selected subarray; and (k) with the correlation function, the effective correlation constant and the remaining integer order numbers in the set, computing the spectral position for each selected secondary peak in each selected subarray.

18. The method of claim 17 wherein the index of refraction is dependent on temperature and subarray position, the primary peak has a spectral position representative of temperature, and the method further comprises:

while maintaining the interference element at a first temperature, effecting steps (a) through (k) with an estimated nominal index of refraction to ascertain a first primary peak position, a first effective correlation constant and associated order numbers;

computing first values of the index of refraction with the correlation function using the first primary peak position, the first effective correlation constant and associated order numbers;

while maintaining the interference element at a second temperature, effecting steps (a) through (k) with the nominal index to ascertain a second primary peak position, a second effective correlation constant and associated order numbers;

computing second values of the index of refraction with the correlation function using the second primary peak position, the second effective correlation constant and associated order numbers, the second values being dependent on the subarray positions;

computing a value difference between each first value of the index and its corresponding second value for each corresponding subarray position, a position difference between the first primary peak position and the second primary peak position, and a difference ratio of each value difference to the position difference, and;

storing the resulting difference ratios as a function of subarray position for subsequent use in computing the spectral position for each selected secondary peak in each selected subarray.

19. The method of claim 18 further comprising:
acquiring subsequent primary spectral data defining an associated subsequent primary peak position at any selected time associated with a subsequent temperature of the interference element;
computing a subsequent difference between the subsequent primary peak position and the first primary peak position, a multiplication product of the subsequent difference and each difference ratio to effect corrections in the index of refraction, and totals of the changes and the nominal index of refraction to effect a temperature corrected index of refraction for the selected subarray positions; and
while maintaining the interference element at the subsequent temperature, effecting step (k) with the corrected index of refraction to compute the spectral position for each selected secondary peak in each selected subarray.

20. A method for determining spectral position for a selected secondary peak for an optical interference element in a spectrometric instrument, the instrument including a dispersion element and a detector receptive of dispersed light from the element, the detector having a plurality of detecting subarrays, each subarray being at a different position on the detector, the interference element being receptive of a light source to effect through the dispersion element and the detector a series of regular secondary spectral peaks related to spectral positions in the subarrays, the instrument having a nominal calibration for spectral position versus spectral positions in the subarrays, the instrument further including a calibration source of a primary spectral peak having an identified spectral position, each secondary peak having an integer order number identified by a correlation function to a peak spectral position in accordance with a correlation constant and a predetermined index of refraction of the interference element; wherein, to relate the secondary spectral peaks to spectral positions, the method comprises:

(a) acquiring primary spectral data for the primary peak in a first subarray position, and secondary spectral data for secondary peaks in the first subarray position and in other selected subarray positions;

(b) estimating an initial correlation constant and a specified range thereof;

(c) with the correlation function, the identified spectral position, and the initial correlation constant, calculating a tentative order number, and selecting a nearest integer order number to the tentative order number;

(d) with the correlation function, the identified spectral position and the nearest integer order number, calculating a corresponding first correlation constant to thereby effect a number-constant pair consisting of the nearest integer order number and the first correlation constant;

(e) recalculating a corresponding correlation constant with a new order number constituting said nearest integer order number shifted by one to thereby effect a further number-constant pair consisting of the shifted order number and the corresponding correlation constant;

(f) repeating step (e) with further integer order numbers shifted by additional ones until a set of number-constant pairs is effected for the specified range of correlation constant;

(g) in another selected subarray, identifying a secondary spectral peak of the secondary spectral data to a nominal peak spectral position determined by the nominal calibration;

(h) with the correlation function, the nominal peak spectral position and each correlation constant of the set, computing further order numbers to effect additional number-constant pairs;

(i) designating all correlation constants in the additional pairs associated with order numbers that are non-integers, and deleting all number-constant pairs from the full set having the designated correlation constants, thereby reducing the set of number-constant pairs;

(j) repeating steps (g), (h) and (i) until a single correlation constant in the pairs of the set remains to establish an effective correlation constant and corresponding remaining integer order numbers for the calibration subarray and each selected subarray; and (k) with the correlation function, the effective correlation constant and the remaining integer order numbers in the set, computing the spectral position for each selected secondary peak in each selected subarray.

21. The method of claim 20 wherein the index of refraction is dependent on temperature and subarray position, the primary peak has a spectral position representative of temperature, and the method further comprises:

while maintaining the interference element at a first temperature, effecting steps (a) through (k) with an estimated nominal index of refraction to ascertain a first primary peak position, a first effective correlation constant and associated order numbers;

computing first values of the index of refraction with the correlation function using the first primary peak position, the first effective correlation constant and associated order numbers;

while maintaining the interference element at a second temperature, effecting steps (a) through (k) with the nominal index to ascertain a second primary peak position, a second effective correlation constant and associated order numbers;

computing second values of the index of refraction with the correlation function using the second primary peak position, the second effective correlation constant and associated order numbers, the second values being dependent on the subarray positions;

computing a value difference between each first value of the index and its corresponding second value for each corresponding subarray position, a position difference between the first primary peak position and the second primary peak position, and a difference ratio of each value difference to the position difference; and storing the resulting difference ratios as a function of subarray position for subsequent use in computing the spectral position for each selected secondary peak in each selected subarray.

22. The method of claim 21 further comprising:
acquiring subsequent primary spectral data defining an associated subsequent primary peak position at any selected time associated with a subsequent temperature of the interference element;
computing a subsequent difference between the subsequent primary peak position and the first primary peak position, a multiplication product of the subsequent difference and each difference ratio to effect corrections in the index of refraction, and totals of the changes and the nominal index of refraction to effect a temperature corrected index of refraction for the selected subarray positions; and
while maintaining the interference element at the subsequent temperature, effecting steps (a) through (k) with the corrected index of refraction to compute the spectral position for each selected secondary peak in each selected subarray.

23. An apparatus for analyzing spectral data, including a spectrometric instrument having a dispersion element and a detector receptive of dispersed light from the element, the detector having a plurality of detecting subarrays, with each subarray being at a different position on the detector; the apparatus comprising:

means for acquiring first spectral data for a drift standard for selected subarray positions at a first time;

means for comparing the first spectral data to a preassigned zero position for each selected subarray to obtain first offset data; means for acquiring second spectral data for a drift standard for selected subarray positions at a second time;

means for comparing the second spectral data to the zero position for each selected subarray to obtain second offset data; and means for utilizing the first offset data to obtain a first offset function defining an offset for any subarray position, using the second offset data to obtain a second offset function defining an offset for any subarray position, and utilizing the difference between the first offset function and the second offset function to obtain a spectral shift for any subarray position at any selected time relative to the first time.

24. The apparatus of claim 23 wherein the drift standard for the second spectral data are the drift standard for the first spectral data, and the selected subarray positions for the second spectral data are the selected subarray positions for the first spectral data.

25. The apparatus of claim 23 wherein the selected time is between the first time and the second time, and the spectral shift is obtained by interpolation between the first offset function and the second offset function.

26. The apparatus of claim 23 wherein the detector has a detector surface, and the detecting subarrays constitute a small portion of the detector surface.

27. The apparatus of claim 26 wherein the selected subarrays are substantially fewer in number than the plurality of detecting subarrays.

28. The apparatus of claim 23 further comprising means for acquiring test spectral data for a test sample at the selected time, and means for using the spectral shift to standardize the test spectral data to hypothetical instrument conditions.

29. The apparatus of claim 23 further comprising a base matrix model formed of base spectral data for at least one selected analyte, means for acquiring test spectral data for a test sample at the selected time, means for using the spectral shift to shift the base spectral data so as to effect a shifted matrix model associated with instrument conditions at the selected time, and means for applying the shifted matrix model to the test spectral data so as to yield a parameter representing concentration of the selected analyte.

30. The apparatus of claim 23 wherein, to obtain a base matrix model formed of base spectral data for at least one selected analyte, the matrix model being for use with the test spectral data so as to yield a parameter representing concentration of the selected analyte, the first time is an initial time, the second time is a subsequent time, and the selected time is an interim time, the apparatus further comprises means for obtaining preliminary spectral data for each selected analyte at the interim time, means for effecting the steps of acquiring, comparing and utilizing to obtain the spectral shift as an interim spectral shift for the interim time, and means for applying the interim spectral shift to the preliminary spectral data to effect the base spectral data for the base matrix model associated with instrument conditions at the initial time.

31. The apparatus of claim 30 wherein the test spectral data are acquired at predetermined increments in associated subarrays, the preliminary spectral data are obtained for a multiplicity of sub-increments smaller than the predetermined increments, and the shifted matrix model is applied with model spectral data culled for the predetermined increments from the preliminary spectral data.

32. The apparatus of claim 31 wherein the subarrays are each formed of a plurality of photosensitive pixels with a predetermined number of increments in each pixel, the increments being effected by slit-scanning with the instrument.

33. The apparatus of claim 32 wherein the multiplicity of sub-increments are effected by the slit-scanning, the predetermined number is generally non-integral, and the apparatus further comprises means for determining an axis shifting of spectral positions attributed to the predetermined number being non-integral, and means for using the axis shifting to correct for the predetermined number being non-integral.

34. The apparatus of claim 33 wherein the means for determining the axis shifting comprises:

means for acquiring spectral data for a selected spectral feature across a preselected pixel for each of a series of multiplicities of sub-increments, one multiplicity having a preselected integral nominal number of sub-increments approximating the predetermined number, and other multiplicities having auxiliary numbers of sub-increments, the auxiliary numbers being smaller and larger than the nominal total, such spectral data effecting an associated original data series;

means for shifting each data series in spectral position by one pixel to effect corresponding shifted data series;

means for subtracting each original shifted data series from its corresponding shifted data series to effect a first set of differences for the smaller auxiliary numbers and a second set of differences for the larger auxiliary numbers;

means for fitting the first set of differences to a first straight line and the second set of differences to a second straight line; and means for ascertaining an intersection point for the first straight line and the second straight line, whereby the intersection point has a displacement determinative of the axis shifting.

35. The apparatus of claim 33 wherein the means for using comprises means for determining a correction factor from the axis shifting, and means for applying the correction factor to the base spectral data to effect corrected base spectral data for the base matrix model.

36. The apparatus of claim 33 wherein spectral data are related by a function $$Y_1 = a_0 Y_0 + b(dY_0/dX_0) + e$$

where $Y_0$ is derivative spectral data for sub-increments having an increment size corresponding to the tentative total, $Y_1$ is increment spectral data for the sub-increments, $X_0$ is spectral position in the sub-increments, $dY_0/dX_0$ is a derivative, a and b are parameters such that a parameter ratio b/a represents a tentative axis shift, and e is a fitting residual; and the apparatus further comprises the stored function, and further comprises:

(a) means for estimating a tentative sub-increment size corresponding to an estimated tentative total for each of the selected subarrays;

(b) means for acquiring derivative spectral data, and further acquiring increment spectral data using the tentative increment size, for each of the selected subarrays;

(c) means for fitting the derivative spectral data and the increment spectral data to the function to compute the parameter ratio for each of the selected subarrays;

(d) means for fitting the increment size and the parameter ratio to a curve to ascertain deviation of the curve from a straight line;

(e) means for using the deviation to estimate a corrected magnification corresponding to axis shifting; and (f) means for repetitively applying the means (b) through (e) until any deviation from a straight line of means (d) is less than a preselected limit, thereby effecting the integral total.

37. The apparatus of claim 23 wherein the drift standard is a standard sample containing at least one analyte to effect a spectral peak in each of the selected subarray positions.

38. The apparatus of claim 23 wherein the drift standard is an optical element receptive of a light source to effect a series of regular secondary spectral peaks related to spectral positions within each of the selected subarray positions.

39. The apparatus of claim 38 wherein the instrument has a nominal calibration for spectral position versus spectral positions in the subarrays, the instrument further includes a calibration source of a primary spectral peak having an identified spectral position, each secondary peak has an integer order number identified by correlation function to a peak spectral position in accordance with a correlation constant and a predetermined index of refraction of the interference element and, to relate the secondary spectral peaks to spectral positions, the apparatus further comprises:

(a) means for acquiring primary spectral data for the primary peak in a first subarray position, and secondary spectral data for secondary peaks in the first subarray position and in other selected subarray positions;

(b) means for calculating a tentative order number with the correlation function, the identified spectral position, a pre-estimated initial correlation constant and a specified range thereof;

(c) means for selecting a nearest integer order number to the tentative order number;

(d) means for calculating a corresponding first correlation constant with the correlation function, the identified spectral position and the nearest integer order number, so as to thereby effect a number-constant pair consisting of the nearest integer order number and the first correlation constant;

(e) means for recalculating a corresponding correlation constant with a new order number constituting said nearest integer order number shifted by one to thereby effect a further number-constant pair consisting of the shifted order number and the corresponding correlation constant;

(f) means for repetitively applying the means (e) with further integer order numbers shifted by additional ones until a set of number-constant pairs is effected for the specified range of correlation constant;

(g) means for identifying, in another selected subarray, a secondary spectral peak of the secondary spectral data to a nominal peak spectral position determined by the nominal calibration;

(h) means for computing further order numbers to effect additional number-constant pairs, said means utilizing the correlation function, the nominal peak spectral position and each correlation constant of the set;

(i) means for designating all correlation constants in the additional pairs associated with order numbers that are non-integers, and for deleting all number-constant pairs from the full set having the designated correlation constants, thereby reducing the set of number-constant pairs;

(j) means for repetitively applying the means (g), (h) and (i) until a single correlation constant in the pairs of the set remains to establish an effective correlation constant and corresponding remaining integer order numbers for the calibration subarray and each selected subarray; and (k) means for computing the spectral position for each selected secondary peak in each selected subarray, said means utilizing the correlation function, the effective correlation constant and the remaining integer order numbers in the set.

40. The apparatus of claim 39 wherein the index is dependent on temperature and subarray position, the primary peak has a spectral position representative of temperature, and the apparatus further comprises:

means for repetitively applying the means (a) through (k) with a predetermined nominal index of refraction, while maintaining the interference element at a first temperature, so as to ascertain first primary spectral data defining an associated first primary peak position, a first effective correlation constant and associated order numbers;

means for computing first values of the index of refraction with the correlation function using the first primary peak position, the first effective correlation constant and associated order numbers;

means for repetitively applying the means (a) through (k) with the nominal index, while maintaining the interference element at a second temperature, so as to ascertain second primary spectral data defining an associated second primary peak position, a second effective correlation constant and associated order numbers;

means for computing second values of the index of refraction with the correlation function using the second primary peak position, the second effective correlation constant and associated order numbers, the second values being dependent on the subarray positions;

means for computing a value difference between each first value of the index and its corresponding second value for each corresponding subarray position, a position difference between the first primary peak spectral position and the second primary peak spectral position, and a difference ratio of each value difference to the position difference; and means for storing the resulting difference ratios as a function of subarray position for subsequent use in computing the spectral position for each selected secondary peak in each selected subarray.

41. The apparatus of claim 40 further comprising:

means for acquiring subsequent primary spectral data defining an associated subsequent primary peak position at any selected time;

means for computing a subsequent difference between the subsequent primary peak position and the first primary peak position, a multiplication product of the subsequent difference and each difference ratio to effect corrections in the index of refraction, and totals of the changes and the nominal index of refraction, so as to effect a temperature corrected index of refraction for the selected subarray positions; and means for repetitively applying the means (a) through (k) with the nominal index, while maintaining the interference element at the subsequent temperature, so as to compute the spectral position for each selected secondary peak in each selected subarray.

42. An apparatus for determining spectral position for a selected secondary peak for an optical interference element in a spectrometric instrument, the instrument including a dispersion element and a detector receptive of dispersed light from the element, the detector having a plurality of detecting subarrays, each subarray being at a different position on the detector, the interference element being receptive of a light source to effect through the dispersion element and the detector a series of regular secondary spectral peaks related to spectral positions in the subarrays, the instrument having a nominal calibration for spectral position versus spectral positions in the subarrays, the instrument further including a calibration source of a primary spectral peak having an identified spectral position, each secondary peak having an integer order number identified by a correlation function to a peak spectral position in accordance with a correlation constant and a predetermined index of refraction of the interference element; wherein, to relate the secondary spectral peaks to spectral positions, the apparatus comprises:

(a) means for acquiring primary spectral data for the primary peak in a first subarray position, and secondary spectral data for secondary peaks in the first subarray position and in other selected subarray positions;

(b) means for calculating a tentative order number with the correlation function, the identified spectral position, a pre-estimated initial correlation constant and a specified range thereof;

(c) means for selecting a nearest integer order number to the tentative order number;

(d) means for calculating a corresponding first correlation constant with the correlation function, a predetermined index of refraction, the identified spectral position and the nearest integer order number, so as to thereby effect a number-constant pair consisting of the nearest integer order number and the first correlation constant;

(e) means for recalculating a corresponding correlation constant with a new order number constituting said nearest integer order number shifted by one to thereby effect a further number-constant pair consisting of the shifted order number and the corresponding correlation constant;

(f) means for repetitively applying the means (e) with further integer order numbers shifted by additional ones until a set of number-constant pairs is effected for the specified range of correlation constant;

(g) means for identifying, in another selected subarray, a secondary spectral peak of the secondary spectral data to a nominal peak spectral position determined by the nominal calibration;

(h) means for computing further order numbers to effect additional number-constant pairs, said means utilizing the correlation function, the nominal peak spectral position and each correlation constant of the set;

(i) means for designating all correlation constants in the additional pairs associated with order numbers that are non-integers, and for deleting all number-constant pairs from the full set having the designated correlation constants, thereby reducing the set of number-constant pairs;

(j) means for repetitively applying the means (g), (h) and (i) until a single correlation constant in the pairs of the set remains to establish an effective correlation constant and corresponding remaining integer order numbers for the calibration subarray and each selected subarray; and (k) means for computing the spectral position for each selected secondary peak in each selected subarray, said means utilizing the correlation function, the effective correlation constant and the remaining integer order numbers in the set.

43. The apparatus of claim 42 wherein the index is dependent on temperature and subarray position, the primary peak has a spectral position representative of temperature, and the apparatus further comprises:

means for repetitively applying the means (a) through (k) with a predetermined nominal index of refraction, while maintaining the interference element at a first temperature, so as to ascertain first primary spectral data defining an associated first primary peak position, a first effective correlation constant and associated order numbers;

means for computing first values of the index of refraction with the correlation function using the first primary peak position, the first effective correlation constant and associated order numbers;

means for repetitively applying the means (a) through (k) with the nominal index, while maintaining the interference element at a second temperature, so as to ascertain second primary spectral data defining an associated second primary peak position, a second effective correlation constant and associated order numbers;

means for computing second values of the index of refraction with the correlation function using the second primary peak position, the second effective correlation constant and associated order numbers, the second values being dependent on the subarray positions;

means for computing a value difference between each first value of the index and its corresponding second value for each corresponding subarray position, a position difference between the first primary peak spectral position and the second primary peak spectral position, and a difference ratio of each value difference to the position difference; and means for storing the resulting difference ratios as a function of subarray position for subsequent use in computing the spectral position for each selected secondary peak in each selected subarray.

44. The apparatus of claim 43 further comprising:

means for acquiring subsequent primary spectral data defining an associated subsequent primary peak position at any selected time;

means for computing a subsequent difference between the subsequent primary peak position and the first primary peak position, a multiplication product of the subsequent difference and each difference ratio to effect corrections in the index of refraction, and totals of the changes and the nominal index of refraction, so as to effect a temperature corrected index of refraction for the selected subarray positions; and means for repetitively applying the means (a) through (k) with the nominal index, while maintaining the interference element at the subsequent temperature, so as to compute the spectral position for each selected secondary peak in each selected subarray.

45. A computer readable storage medium for utilization to analyze spectral data for a sample in a spectrometric instrument that includes a dispersion element and a detector receptive of dispersed light from the element, the detector having a plurality of detecting subarrays with each subarray being at a different position on the detector, the instrument further including means for acquiring first spectral data for a drift standard for selected subarray positions at a first time, means for acquiring second spectral data for a drift standard for selected subarray positions at a second time, and computing means receptive of the spectral data for computing corresponding spectral information representative of the sample, the storage medium having data code and program code embodied therein so as to be readable by the computing means, wherein the data code comprises a preassigned zero position for each selected subarray, and the program code comprises means for comparing the first spectral data to the preassigned zero position for each selected subarray to obtain first offset data, means for comparing the second spectral data to the zero position for each selected subarray to obtain second offset data, and means for utilizing the first offset data and the second offset data to obtain a spectral shift for any subarray position at any selected time relative to the first time.

46. The storage medium of claim 45 wherein the means for utilizing comprises means for using the first offset data to obtain a first offset function defining an offset for any subarray position, means for using the second offset data to obtain a second offset function defining an offset for any subarray position, and means for utilizing the difference between the first offset function and the second offset function to obtain the spectral shift.

47. The storage medium of claim 45 wherein the selected time is between the first time and the second time, and the spectral shift is obtained by interpolation between the first offset function and the second offset function.

48. The storage medium of claim 45 wherein the instrument further includes means for acquiring test spectral data for a test sample at the selected time, and the program code further comprises means for using the spectral shift to standardize the test spectral data to hypothetical instrument conditions.

49. The storage medium of claim 45 wherein the instrument further includes means for acquiring test spectral data for a test sample at the selected time, the data code further comprises a base matrix model formed of base spectral data for at least one selected analyte, and the program code further comprises means for using the spectral shift to shift the base spectral data so as to effect a shifted matrix model associated with instrument conditions at the selected time, and means for applying the shifted matrix model to the test spectral data so as to yield a parameter representing concentration of the selected analyte.

50. The storage medium of claim 45 wherein the instrument has a nominal calibration for spectral position versus spectral positions in the subarrays, the instrument further includes a calibration source of a primary spectral peak having an identified spectral position, the drift standard is an optical element receptive of a light source to effect a series of regular secondary spectral peaks related to spectral positions within each of the selected subarray positions, each secondary peak has an integer order number identified by correlation function to a peak spectral position in accordance with a correlation constant and a predetermined index of refraction of the interference element, and the instrument further includes:

(a) means for acquiring primary spectral data for the primary peak in a first subarray position, and secondary spectral data for secondary peaks in the first subarray position and in other selected subarray positions; and the program code further comprises:

(b) means for calculating a tentative order number with the correlation function, the identified spectral position, a pre-estimated initial correlation constant and a specified range thereof;

(c) means for selecting a nearest integer order number to the tentative order number;

(d) means for calculating a corresponding first correlation constant with the correlation function, the identified spectral position and the nearest integer order number, so as to thereby effect a number-constant pair consisting of the nearest integer order number and the first correlation constant;

(e) means for recalculating a corresponding correlation constant with a new order number constituting said nearest integer order number shifted by one to thereby effect a further number-constant pair consisting of the shifted order number and the corresponding correlation constant;

(f) means for repetitively applying the means (e) with further integer order numbers shifted by additional ones until a set of number-constant pairs is effected for the specified range of correlation constant;

(g) means for identifying, in another selected subarray, a secondary spectral peak of the secondary spectral data to a nominal peak spectral position determined by the nominal calibration;

(h) means for computing further order numbers to effect additional number-constant pairs, said means utilizing the correlation function, the nominal peak spectral position and each correlation constant of the set;

(i) means for designating all correlation constants in the additional pairs associated with order numbers that are non-integers, and for deleting all number-constant pairs from the full set having the designated correlation constants, thereby reducing the set of number-constant pairs;

(j) means for repetitively applying the means (g), (h) and (i) until a single correlation constant in the pairs of the set remains to establish an effective correlation constant and corresponding remaining integer order numbers for the calibration subarray and each selected subarray; and (k) means for computing the spectral position for each selected secondary peak in each selected subarray, said means utilizing the correlation function, the effective correlation constant and the remaining integer order numbers in the set.

51. A computer readable storage medium for utilization to determine spectral position for a selected secondary peak for an optical interference element in a spectrometric instrument that includes a dispersion element and a detector receptive of dispersed light from the element, the detector having a plurality of detecting subarrays, each subarray being at a different position on the detector, the interference element being receptive of a light source to effect through the dispersion element and the detector a series of regular secondary spectral peaks related to spectral positions in the subarrays, the instrument further including a calibration source of a primary spectral peak having an integer order number identified by a correlation function to a peak spectral position in accordance with a correlation constant and a predetermined index of refraction of the interference element, and the instrument further including:

(a) means for acquiring primary spectral data for the primary peak in a first subarray position, and secondary spectral data for secondary peaks in the first subarray position and in other selected subarray positions;

the storage medium having data code and program code embodied therein so as to be readable by the computing means, wherein the data code comprises a nominal calibration of the instrument for spectral position versus spectral positions in the subarrays, the correlation function, and the predetermined index of refraction; and the program code comprises:

(b) means for calculating a tentative order number with the correlation function, the identified spectral position, a pre-estimated initial correlation constant and a specified range thereof;

(c) means for selecting a nearest integer order number to the tentative order number;

(d) means for calculating a corresponding first correlation constant with the correlation function, a predetermined index of refraction, the identified spectral position and the nearest integer order number, so as to thereby effect a number-constant pair consisting of the nearest integer order number and the first correlation constant;

(e) means for recalculating a corresponding correlation constant with a new order number constituting said nearest integer order number shifted by one to thereby effect a further number-constant pair consisting of the shifted order number and the corresponding correlation constant;

(f) means for repetitively applying the means (e) with further integer order numbers shifted by additional ones until a set of number-constant pairs is effected for the specified range of correlation constant;

(g) means for identifying, in another selected subarray, a secondary spectral peak of the secondary spectral data to a nominal peak spectral position determined by the nominal calibration;

(h) means for computing further order numbers to effect additional number-constant pairs, said means utilizing the correlation function, the nominal peak spectral position and each correlation constant of the set;

(i) means for designating all correlation constants in the additional pairs associated with order numbers that are non-integers, and for deleting all number-constant pairs from the full set having the designated correlation constants, thereby reducing the set of number-constant pairs;

(j) means for repetitively applying the means (g), (h) and (i) until a single correlation constant in the pairs of the set remains to establish an effective correlation constant and corresponding remaining integer order numbers for the calibration subarray and each selected subarray; and (k) means for computing the spectral position for each selected secondary peak in each selected subarray, said means utilizing the correlation function, the effective correlation constant and the remaining integer order numbers in the set.

52. A method for analyzing spectral data in a spectrometric instrument including a dispersion element and a detector receptive of dispersed light from the element, the detector having a plurality of detecting subarrays, with each subarray being at a different position on the detector; the method comprising steps of:

acquiring first spectral data for a drift standard for selected subarray positions at a first time;

comparing the first spectral data to a preassigned zero position for each selected subarray to obtain first offset data;

acquiring second spectral data for a drift standard for selected subarray positions at a second time;

comparing the second spectral data to the zero position for each selected subarray to obtain second offset data; and utilizing the first offset data and the second offset data to obtain a spectral shift for any subarray position at any selected time relative to the first time.

53. The method of claim 52 wherein the drift standard comprises a narrow band or spectral line received on an array photodetector from an ICP light source to effect an atomic or ionic emission line.

54. An apparatus for analyzing spectral data, including a spectrometric instrument having a dispersion element and a detector receptive of dispersed light from the element, the detector having a plurality of detecting subarrays, with each subarray being at a different position on the detector; the apparatus comprising:

means for acquiring first spectral data for a drift standard for selected subarray positions at a first time;

means for comparing the first spectral data to a preassigned zero position for each selected subarray to obtain first offset data;

means for acquiring second spectral data for a drift standard for selected subarray positions at a second time;

means for comparing the second spectral data to the zero position for each selected subarray to obtain second offset data; and means for utilizing the first offset data and the second offset data to obtain a spectral shift for any subarray position at any selected time relative to the first time.

* * * * *